US012421762B2

(12) United States Patent
Farag

(10) Patent No.: US 12,421,762 B2
(45) Date of Patent: Sep. 23, 2025

(54) REKEYABLE LOCK CYLINDER

(71) Applicant: ASSA ABLOY Americas Residential Inc., New Haven, CT (US)

(72) Inventor: Hanna Farag, Jurupa Valley, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/407,572

(22) Filed: Jan. 9, 2024

(65) Prior Publication Data

US 2024/0229507 A1 Jul. 11, 2024

Related U.S. Application Data

(60) Provisional application No. 63/438,075, filed on Jan. 10, 2023.

(51) Int. Cl.

*E05B 27/00* (2006.01)
*E05B 29/00* (2006.01)

(52) U.S. Cl.

CPC ........ *E05B 27/005* (2013.01); *E05B 27/0053* (2013.01); *E05B 27/0082* (2013.01); *E05B 29/004* (2013.01); *E05B 29/0066* (2013.01); *E05B 27/0035* (2013.01)

(58) Field of Classification Search

CPC .. E05B 27/00; E05B 27/0021; E05B 27/0035; E05B 27/005; E05B 27/0053; E05B 27/0057; E05B 27/0082; E05B 29/004; E05B 29/006; E05B 29/0066; E05B 35/008; E05B 35/083

See application file for complete search history.

(56) References Cited

U.S. PATENT DOCUMENTS 4,376,382 A * 3/1983 Raymond ............. E05B 29/004 70/377
7,900,491 B2 * 3/2011 Chong .................. E05B 29/004 70/495
8,099,988 B1 1/2012 Wheatland
8,291,735 B1 * 10/2012 Damikolas .......... E05B 27/0082 70/494
8,424,349 B2 * 4/2013 Marcelle ............... E05B 29/004 70/377

(Continued)

FOREIGN PATENT DOCUMENTS

CN 105113859 12/2015
WO 2021/212217 10/2021

OTHER PUBLICATIONS

PCT International Search Report and Written Opinion in Application PCT/US2024/011076, mailed May 16, 2024, 12 pages.

(Continued)

*Primary Examiner* — Christopher J Boswell
(74) *Attorney, Agent, or Firm* — Merchant & Gould P.C.

(57) ABSTRACT

A rekeyable lock cylinder with a cylinder body, an inner sleeve, and a plug assembly is provided. The plug assembly includes a plurality of key followers and a corresponding plurality of first racks and second racks disposed in carriers. The first racks correspond to operation of a user key and the second racks correspond to operation of a master key. As such, the lock cylinder is usable in a user/master key system. Disengaging either of the first or second racks from the key followers allows rekeying of the lock cylinder for the user key or the master key.

20 Claims, 17 Drawing Sheets

(56) References Cited

U.S. PATENT DOCUMENTS

| | | | | |
|---|---|---|---|---|
| 8,656,747 | B2 | 2/2014 | Armstrong et al. | |
| 8,739,587 | B2 * | 6/2014 | Chen | E05B 27/0082 70/495 |
| 9,657,499 | B2 * | 5/2017 | Emory | E05B 29/004 |
| 10,612,271 | B2 | 4/2020 | Farag et al. | |
| 11,220,840 | B1 | 1/2022 | Farag | |
| 11,319,726 | B2 | 5/2022 | Rufang | |
| 11,572,708 | B2 * | 2/2023 | Farag | E05B 27/0082 |
| 11,988,018 | B2 * | 5/2024 | Farag | E05B 27/0082 |
| 12,024,921 | B2 * | 7/2024 | Rufang | E05B 27/0082 |
| 12,104,404 | B2 * | 10/2024 | Farag | E05B 27/0082 |
| 2005/0103073 | A1 | 5/2005 | Armstrong et al. | |
| 2013/0086957 | A1 | 4/2013 | Emory | |
| 2022/0213716 | A1 | 7/2022 | Farag | |

OTHER PUBLICATIONS

PCT International Preliminary Report on Patentability in Application PCT/US2024/011076, mailed Jul. 24, 2025, 6 pages.

* cited by examiner

REKEYABLE LOCK CYLINDER

CROSS-REFERENCE TO RELATED APPLICATION(S)

This application claims priority to, and the benefit of, U.S. Provisional Patent Application No. 63/438,075, filed Jan. 10, 2023, the disclosure of which is hereby incorporated by reference herein in its entirety.

BACKGROUND

Lock cylinders that can be rekeyed without removal of a plug assembly are known. These types of locks are highly beneficial to consumers because the locks can be easily rekeyed without calling a locksmith. Additionally, master/user key systems are known whereby a master key can open all the locks in a system although each lock also has its own unique user key. This type of system permits organization along departmental or other functional lines to allow supervisory or emergency access. There is a need, however, for a rekeyable lock that facilitates master/user key systems and rekeying of both master and user keys.

SUMMARY

This disclosure relates generally to locks, and in particular, this disclosure relates to a lock with a rekeyable lock cylinder. According to one aspect of the present disclosure, a rekeyable lock cylinder is provided with a master and user key system functionality. The rekeyable lock cylinder includes a plug assembly and an inner sleeve disposed within a cylinder body. The plug assembly allows both a master key and a user key to be received and due to selective engagement between the plug assembly, the inner sleeve, and the cylinder body operate the lock cylinder. Additionally, the plug assembly enables for both the master key and the user key to be rekeyed and without removal of the plug assembly.

In an aspect, the technology relates to a rekeyable lock cylinder including: a cylinder body defining a longitudinal axis; at least one pin slidably mounted on the cylinder body; an inner sleeve disposed within the cylinder body and being selectively rotatable around the longitudinal axis, the inner sleeve defining a slot extending along the longitudinal axis and at least one pin opening; a plug assembly disposed at least partially within the inner sleeve and being selectively rotatable around the longitudinal axis, the plug assembly including: a plug body having a first side and an opposite second side; at least one key follower slidably mounted on the plug body; a first carrier subassembly disposed on the first side of the plug body, the first carrier subassembly including: a first carrier selectively slidable along the longitudinal axis for rekeying between different user keys; a locking bar slidably mounted on the first carrier and selectively engageable with the slot of the inner sleeve to block rotation of the plug assembly relative to the inner sleeve; and at least one first rack coupled between the at least one key follower and the locking bar to control movement of the locking bar; a second carrier subassembly disposed on the second side of the plug body, the second carrier subassembly including: a second carrier selectively slidable along the longitudinal axis for rekeying between different master keys; at least one slider slidably mounted on the second carrier, wherein based on a position of the at least one slider within the second carrier, the at least one pin is selectively engageable with the at least one pin opening of the inner sleeve to block rotation of the inner sleeve relative to the cylinder body; and at least one second rack coupled between the at least one key follower and the at least one slider to control movement of the at least one slider.

In an example, the rekeyable lock cylinder further includes at least one pin biasing member, the at least one pin biasing member biases the at least one pin toward the at least one pin opening of the inner sleeve. In another example, the at least one pin biasing member also biases the at least one slider inwards relative to the second carrier. In yet another example, the at least one slider is not directly engaged with a biasing member disposed within the second carrier. In still another example, the cylinder body includes a chimney housing the at least one pin, the chimney radially projecting from an exterior surface of the cylinder body. In an example, the cylinder body has an inner surface facing the inner sleeve, the inner surface does not have a longitudinally extending groove.

In another example, the inner sleeve defines a plurality of circumferential slits. In yet another example, at least a portion of the at least one first rack extends at least partially within a slit of the plurality of circumferential slits when the at least one first rack is positioned by a master key. In still another example, at least a portion of the at least one second rack extends at least partially within a slit of the plurality of circumferential slits when the at least one second rack is positioned without a key within a keyway opening. In an example, the at least one key follower includes a first rack engagement feature configured to engage the at least one first rack and a second rack engagement feature configured to engage the at least one second rack, the first rack engagement feature is the same as the second rack engagement feature. In another example, the at least one key follower includes a first rack engagement feature configured to engage the at least one first rack and a second rack engagement featured configure to engage the at least one second rack, the first rack engagement feature is different than the second rack engagement feature.

In yet another example, the at least one first rack includes a first pin engagement feature configured to engage the at least one key follower and the at least one second rack includes a second pin engagement feature configured to engage the at least one key follower, the first pin engagement feature is the same as the second pin engagement feature. In still another example, the at least one first rack includes a first pin engagement feature configured to engage the at least one key follower and the at least one second rack includes a second pin engagement feature configured to engage the at least one key follower, the first pin engagement feature is different than the second pin engagement feature. In an example, the at least one second rack includes a slider engagement feature configured to engage with the at least one slider. In another example, the slider engagement feature is a single protruding lug. In yet another example, the plug assembly includes a plug face extending from an end of the plug body, the plug face defining a first rekeying tool opening aligned with the first carrier and a second rekeying tool opening aligned with the second carrier, the first rekeying tool opening having a different size or shape than the second rekeying tool opening.

In another aspect, the technology relates to a rekeyable lock cylinder including: a cylinder assembly including: a cylinder body defining a longitudinal axis; and at least one pin mounted on the cylinder body; an inner sleeve disposed within the cylinder body, the inner sleeve defining a slot extending along the longitudinal axis and at least one pin opening for receiving at least a portion of the at least one pin, wherein the at least one pin is inwardly biased toward the inner sleeve and selectively moveable between an engaged position, whereby the inner sleeve is blocked from rotating around the longitudinal axis relative to the cylinder body, and a disengaged position, whereby the inner sleeve is allowed to rotate around the longitudinal axis relative to the cylinder body; and a plug assembly disposed at least partially within the inner sleeve, the plug assembly including: a plug body defining a keyway opening; at least one key follower slidably mounted on the plug body; a first carrier subassembly having a locking bar and at least one first rack, the at least one first rack coupled between the locking bar and the at least one first rack, wherein the locking bar is selectively movable between a locked position and an unlocked position upon receipt of a valid user key within the keyway opening, wherein in the locked position, the locking bar is disposed at least partially within the slot of the inner sleeve blocking rotation of the plug assembly around the longitudinal axis relative to the inner sleeve, wherein in the unlocked position, the locking bar is retracted from the slot of the inner sleeve allowing rotation of the plug assembly around the longitudinal axis relative to the inner sleeve, and wherein the at least one first rack is selectively disengagable from the at least one key follower to allow rekeying between different user keys; and a second carrier subassembly having at least one slider and at least one second rack, the at least one second rack coupled between the at least one slider and the at least one second rack, wherein the at least one slider is selectively moveable between a blocked position and an unblocked position upon receipt of a valid master key within the keyway opening, wherein in the blocked position, the at least one slider extends into the at least one pin opening of the inner sleeve forcing the at least one pin towards the disengaged position, wherein in the unblocked position, the at least one slider is retracted from the at least one pin opening of the inner sleeve allowing the at least one pin to move towards the engaged position, and wherein the at least one second rack is selectively disengagable from the at least one key follower to allow rekeying between different master keys.

In an example, upon receipt of the valid user key, the at least one slider is in the unblocked position, thereby allowing the plug assembly to rotate around the longitudinal axis while the at least one pin is in the engaged position preventing the inner sleeve from rotating around the longitudinal axis. In another example, upon receipt of the valid user key, both the at least one first rack and the at least one second rack move with the at least one key follower. In yet another example, upon receipt of the valid master key, the at least one slider is in the blocked position, thereby allowing the inner sleeve and the plug assembly to rotate together around the longitudinal axis while the at least one pin is in the disengage position. In still another example, upon receipt of the valid master key, both the at least one first rack and the at least one second rack move with the at least one key follower. In an example, the at least one first rack is moveable in a transverse direction relative to the longitudinal axis, and the at least one first rack has a bitting position such that an end of the at least one first rack extends into the inner sleeve when the valid master key is in the keyway opening.

In another example, the at least one second rack is moveable in a transverse direction relative to the longitudinal axis, and the at least one second rack has a bitting position such that an end of the at least one second rack extends into the inner sleeve when no key is received within the keyway opening. In yet another example, the at least one pin is biased towards the engaged position. In still another example, the locking bar is biased towards the unlocked position. In an example, the at least one slider is not directly biased. In another example, the at least one first rack is different than the at least one second rack.

In yet another example, the at least one pin is biased towards the engaged position, and the locking bar is biased towards the unlocked position, the biasing direction of the at least one pin and the locking bar being in opposing directions.

In another aspect, the technology relates to a method of assembling a rekeyable lock cylinder including: providing a cylinder assembly having a cylinder body defining a longitudinal axis and a chimney housing at least one pin slidable therein; providing an inner sleeve defining a slot extending along the longitudinal axis and at least one pin opening; providing a plug assembly having a plug body with at least one key follower slidable therein; mounting a first carrier subassembly to a first side of the plug body of the plug assembly, the first carrier subassembly having a first carrier selectively slidable along the longitudinal axis for rekeying between different user keys, a locking bar slidably mounted on the first carrier and selectively engageable with the slot of the inner sleeve, and at least one first rack coupled between the at least one key follower and the locking bar to control movement of the locking bar; mounting a second carrier subassembly to a second side of the plug body of the plug assembly, the second carrier subassembly having a second carrier selectively slidable along the longitudinal axis for rekeying between different master keys, at least one slider slidably mounted on the second carrier, wherein based on a position of the at least one slider within the second carrier, the at least one pin is selectively engageable with the at least one pin opening of the inner sleeve, and at least one second rack coupled between the at least one key follower and the at least one slider to control movement of the at least one slider; inserting the plug assembly including the first and second carrier subassemblies at least partially within the inner sleeve, wherein the plug assembly is selectively rotatable within the inner sleeve based on position of the locking bar and the at least one slider; and inserting the inner sleeve with the plug assembly at least partially within the cylinder body, wherein the inner sleeve is selectively rotatable within the cylinder body based on position of the at least one pin.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
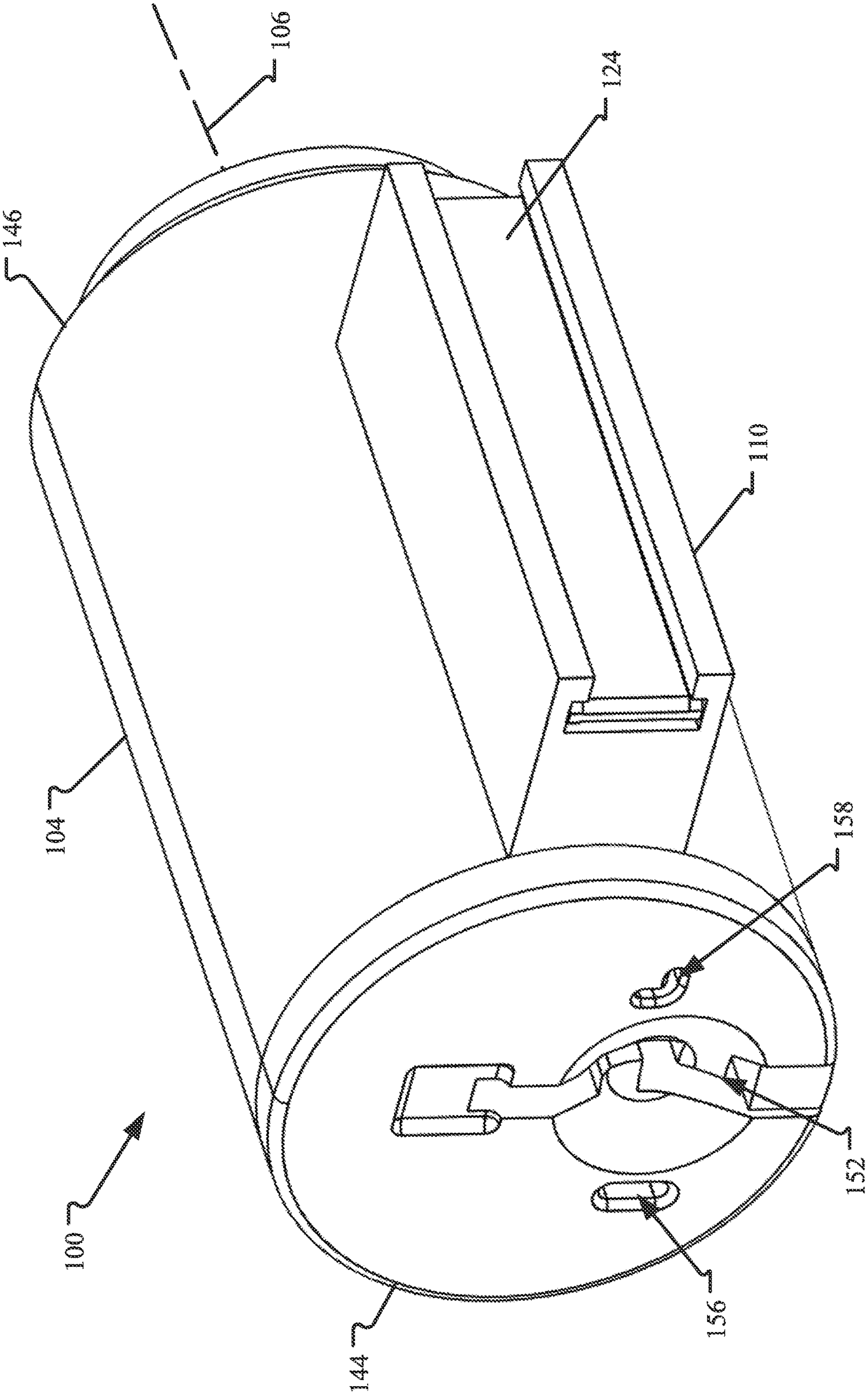
FIG. 1 is a perspective view of an example rekeyable lock cylinder according to an embodiment of this disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," "an example," "an aspect," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other examples whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C). Moreover, one having skill in the art will understand the degree to which terms such as "about," "approximately," or "substantially" convey in light of the measurements techniques utilized herein. To the extent such terms may not be clearly defined or understood by one having skill in the art, the term "about" shall mean plus or minus ten percent.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

Throughout this description, references to orientation (e.g., front(ward), rear(ward), top, bottom, back, right, left, upper, lower, etc.) of the components of the rekeyable lock cylinder relate to their position when installed on a door or handle and are used for ease of description and illustration only. No restriction is intended by use of the terms regardless of how the components of the rekeyable lock cylinder are situated on its own. As used herein, the terms "axial" and "longitudinal" refer to directions and orientations, which extend substantially parallel to a centerline of the component or system. Moreover, the terms "radial" and "radially" refer to directions and orientations, which extend substantially perpendicular to the centerline of the component or system. In addition, as used herein, the term "circumferential" and "circumferentially" refer to directions and orientations, which extend arcuately about the centerline of the component or system.

In the examples described below, a rekeyable lock cylinder is provided with a master and user key system functionality. The rekeyable lock cylinder includes a plug assembly and an inner sleeve disposed within a cylinder body. The plug assembly allows both a master key and a user key to be received and due to selective engagement between the plug assembly, the inner sleeve, and the cylinder body operate the lock cylinder. Additionally, the plug assembly enables for both the master key and the user key to be rekeyed and without removal of the plug assembly.

Figure 2:
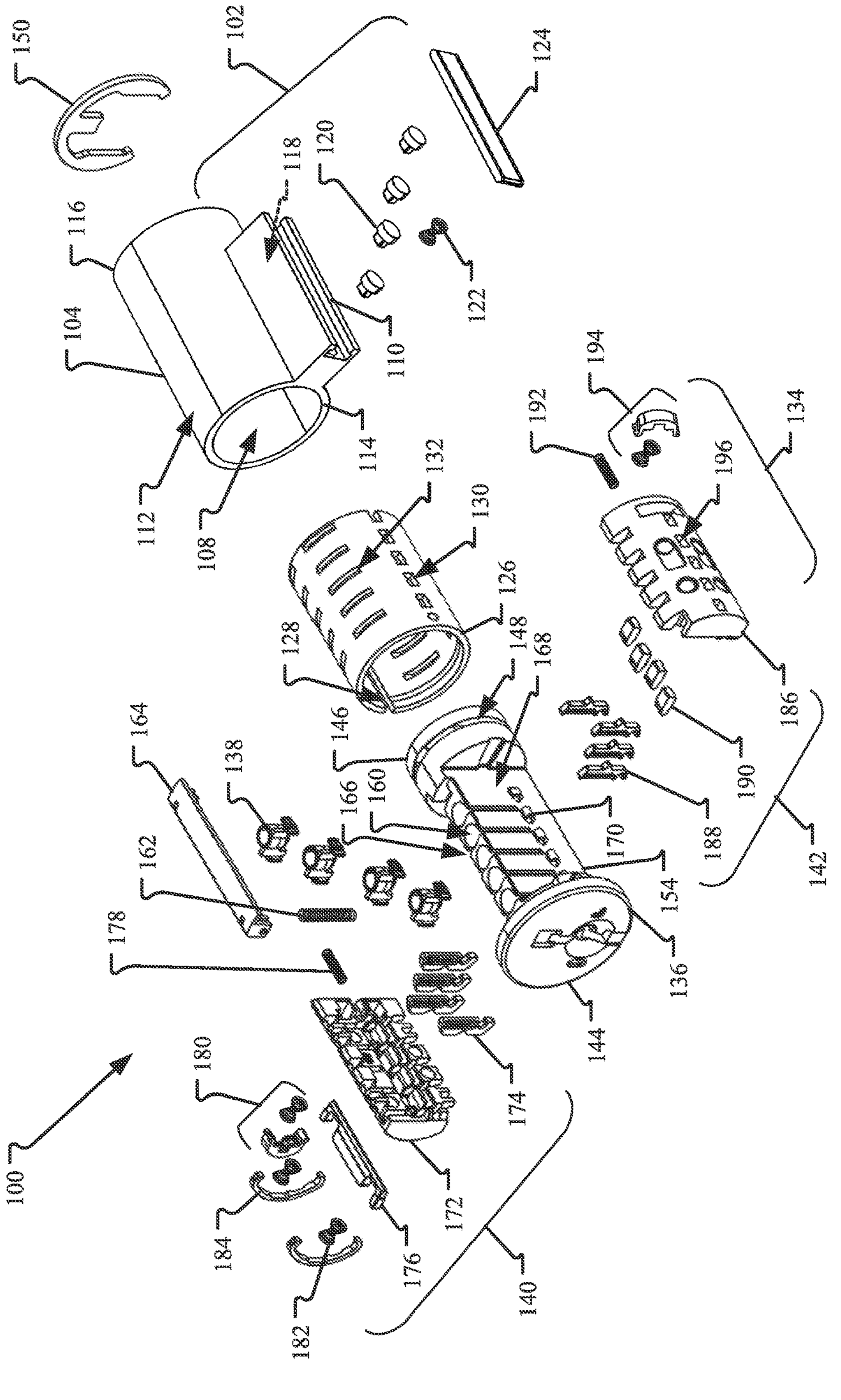
FIG. 2 is a perspective, exploded view of the rekeyable lock cylinder shown in FIG. 1.

FIG. 1 is a perspective view of an exemplary rekeyable lock cylinder 100. FIG. 2 is a perspective, exploded view of the rekeyable lock cylinder 100. Referring concurrently to FIGS. 1 and 2, the rekeyable lock cylinder 100 includes a cylinder assembly 102 having a cylinder body 104 defining a longitudinal axis 106. The cylinder body 104 is substantially cylindrical in shape and hollow. In the example, the cylinder body 104 has an inner surface 108 that is substantially smooth and without any longitudinally extending grooves (e.g., for receiving at least a portion of a locking bar) defined within the inner surface 108. The cylinder body 104 also includes a radially extending chimney 110 projecting from an outer surface 112 of the cylinder body 104. In the example, the chimney 110 extends proximate a front end 114 of the cylinder body 104 and is offset from a rear end 116 of the cylinder body 104. A plurality of channels 118 are defined by the chimney 110 and extend through the chimney 110. A pin 120 is slidably mounted within each channel 118 of the chimney 110. The pin 120 is biased by a biasing member 122 (e.g., a compression spring). A cover 124 is used to retain the pin 120 and the biasing member 122 within the chimney 110.

An inner sleeve 126 is disposed within the cylinder body 104 and is selectively rotatably around the longitudinal axis 106. The inner sleeve 126 is substantially cylindrical in shape so as to correspond to the inner surface 108 of the cylinder body 104. The inner sleeve 126 defines a slot 128 extending along the longitudinal axis 106. In the example, the slot 128 extends completely through the inner sleeve 126. The inner sleeve 126 also defines a plurality of pin openings 130. In the example, the pin openings 130 are positioned opposite of the slot 128 (e.g., 180° apart), however, while the slot 128 is elongated along the longitudinal length of the inner sleeve 126, the pin openings 130 are discrete and spaced along the longitudinal length of the inner sleeve 126. The inner sleeve 126 further defines a plurality of circumferential slits 132. The circumferential slits 132 are longitudinally aligned with the spacing of the pin openings 130. Each pin opening 130 has a corresponding four discrete circumferential slits 132, two slits on opposite sides of the slot 128 and two slits on opposite sides of the pin opening 130.

A plug assembly 134 is disposed at least partially within the inner sleeve 126 and the cylinder body 104. The plug assembly 134 is selectively rotatable around the longitudinal axis 106. The plug assembly 134 includes a plug body 136 supporting a plurality of key followers 138 (e.g., spring loaded pins), a user key carrier subassembly 140, and a master key carrier subassembly 142. The plug body 136 includes a plug face 144 positioned at the front of the plug body 136 and a drive portion 146 positioned at the rear of the plug body 136. The drive portion 146 is configured to couple to a torque blade (not shown) and drive corresponding rotation thereof so as to operate a latch assembly (not shown). The drive portion 146 includes a circumferential recess 148 for receiving at least a portion of a retainer clip 150 and so that the plug assembly 134 and the inner sleeve 126 are retained within the cylinder body 104. The plug face 144 defines a keyway opening 152 that extends into an intermediate portion 154 between the plug face 144 and the drive portion 146. The plug body 136 has a single keyway opening 152 that is configured to receive both user keys and master keys. The plug face 144 also defines a first rekeying tool opening 156 on one side of the keyway opening 152 and a second rekeying tool opening 158 on the other side of the keyway opening 152. The first rekeying tool opening 156 is aligned with and facilitates access to the user key carrier subassembly 140 and the second rekeying tool opening 158 is aligned with and facilitates access to the master key carrier subassembly 142. In the example the first rekeying tool opening 156 has a different size and/or shape than the second rekeying tool opening 158. In other aspects, the first and second rekeying tool openings 156, 158 may have similar sizes and/or shapes.

The intermediate portion 154 has a plurality of channels 160 extending radially in relation to the longitudinal axis 106. The key followers 138 are slidably mounted within the channels 160 and are biased with a biasing member 162 (e.g., compression spring). The key followers 138 and biasing members 162 are retained within the channels 160 by a retaining cap 164. The channels 160 extend partially through the intermediate portion 154 and with the channels 160 open to opposite first and second planer sides 166, 168 of the intermediate portion 154. Each of the planar sides 166, 168 include a plurality of bullet-shaped protruding features 170 that selectively engage with the racks of the carrier subassemblies 140, 142 and facilitate rekeying.

The user key carrier subassembly 140 is disposed on the first side 166 of the plug body 136. The user key carrier subassembly 140 includes a first carrier 172, a plurality of first racks 174 slidably supported on the first carrier 172, and a locking bar 176. The first carrier 172 is selectively slidable along the longitudinal axis 106 for rekeying between different user keys and is biased with a first return spring 178. Additionally, a first spring catch 180 is provided for the first carrier 172 for rekeying. The locking bar 176 is slidably mounted on the first carrier 172 and at least partially within a locking bar slot. The locking bar 176 is biased with a pair of biasing members 182 (e.g., compression spring) which are retained on the first carrier 172 by a pair of clips 184. The first racks 174 are coupled between the key followers 138 and the locking bar 176 so as to control movement of the locking bar 176.

The master key carrier subassembly 142 is disposed on the second side 168 of the plug body 136. The master key carrier subassembly 142 includes a second carrier 186, a plurality of second racks 188 slidably supported on the second carrier 186, and a plurality of sliders 190 (e.g., wafers). The second carrier 186 is selectively slidable along the longitudinal axis 106 for rekeying between different master keys and is biased with a second return spring 192. Additionally, a second spring catch 194 is provided for the second carrier 186 for rekeying. The sliders 190 are slidably mounted within a plurality of holes 196 defined within the second carrier 186 and orthogonal to the longitudinal axis 106. Unlike the locking bar 176 which is elongated and engages with each of the first racks 174, the sliders 190 are discreate and each second rack 188 engages with its own slider 190. The second racks 188 are coupled between the key followers 138 and the sliders 190 so as to control movement of the sliders 190.

As shown in FIG. 2, the plug body 136 has five channels 160 so that five key followers 138, five first and second racks 174, 188, and five sliders 190 can be supporting within the plug assembly 134. Each position of the five key followers 138 corresponds to a bitting position on a key so that when the key is inserted the key follower 138 is moved up or down within the channel 160 and positions the corresponding racks 174, 188 within the plug assembly 134 for operation of the rekeyable lock cylinder 100. For simplicity only, four key followers 138, four first and second racks 174, 188, and four sliders 190 are illustrated. It is appreciated that the plug assembly 134 can support any number of key followers 138 for any number of bitting positions as required or desired (e.g., 3, 4, 5, 6, etc.). In examples, the key followers 138, racks 174, 188, and sliders 190 in each of the five positions are the same. In other examples, one or more of the key followers 138, racks 174, 188, and sliders 190 at the last position (e.g., farthest away from the plug face and the rack) may be different than the others, and for example, be configured to retain the user key and/or the master key within the keyway opening 152 when the plug assembly 134 is in a rotated position during operation.

Figure 4:
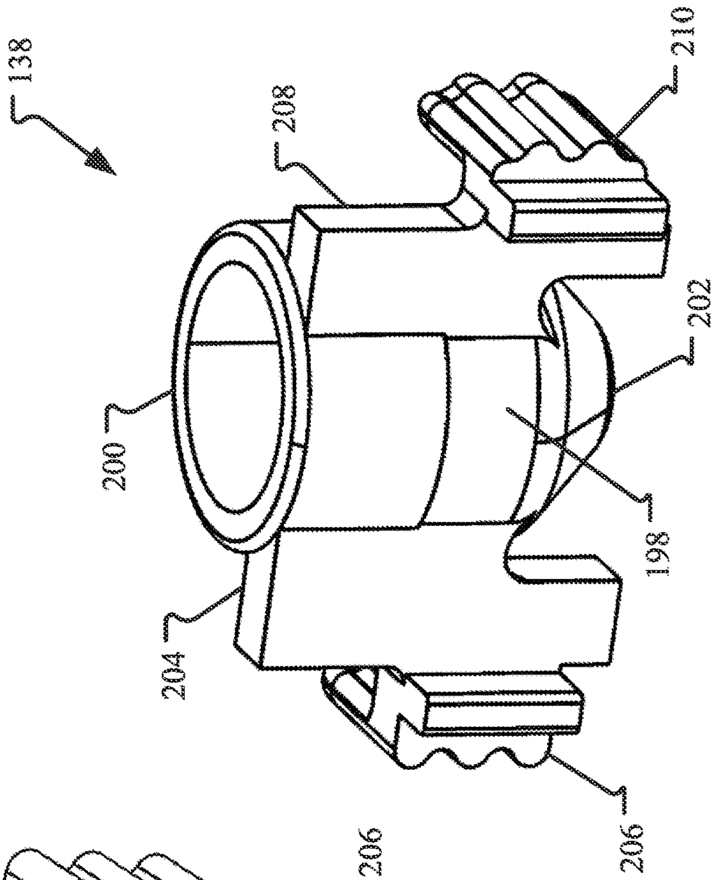
FIG. 4 is another perspective view of the key follower.
Figure 3:
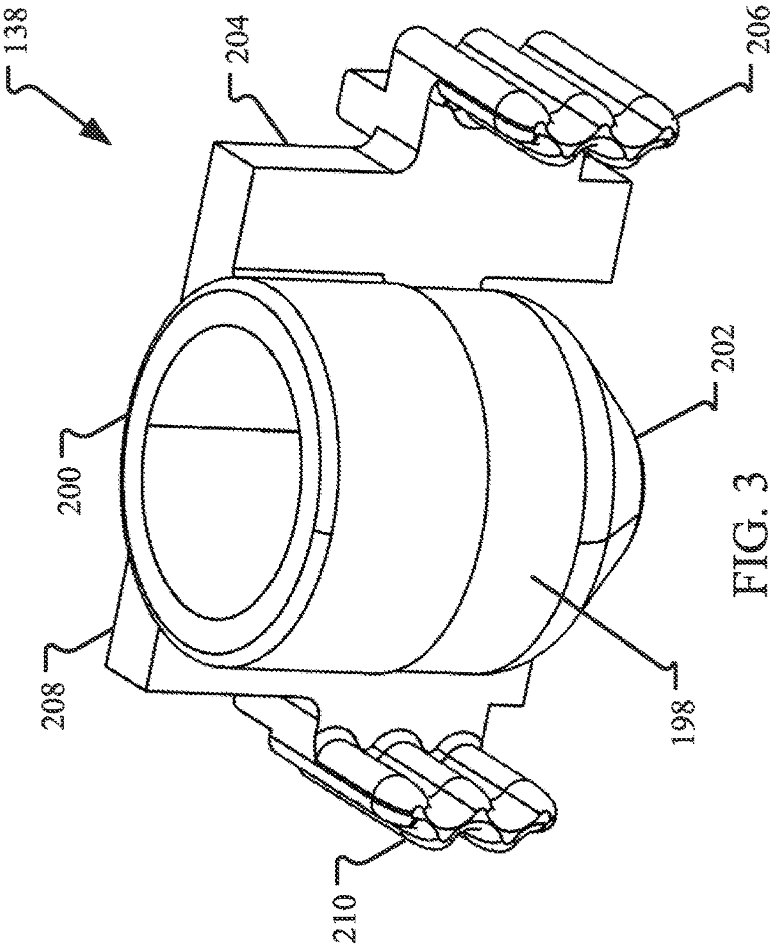
FIG. 3 is a perspective view of a key follower of the rekeyable lock cylinder shown in FIGS. 1 and 2.

FIGS. 3 and 4 are perspective views of the key follower 138. The key follower 138 includes a cylindrical body 198 with a top end 200 and an opposite bottom end 202. The top end 200 is open such that the biasing member 162 (shown in FIG. 2) is at least partially received within the body 198. The bottom end 202 has a tapered nose that is configured to engage with a key when inserted within the lock cylinder and move the key follower 138 within the plug assembly 134 (shown in FIG. 2).

The body 198 includes a first bracket 204 extending therefrom and supporting a first rack engagement feature 206. The first rack engagement feature 206 is configured to selectively engage with the first rack 174 (shown in FIGS. 5-6) and in a plurality of different positions. In the example, the first rack engagement feature 206 is a post that extends in a direction along the longitudinal axis 106 (shown in FIG. 1). The post may include a plurality of semi-circular ridges, and for example, three ridges on one side and two ridges on the other side. The body 198 also includes a second bracket 208 extending therefrom and supporting a second rack engagement feature 210. The second rack engagement feature 210 is configured to selectively engage with the second rack 188 (shown in FIGS. 7-8) and in a plurality of different positions. In the example, the second rack engagement feature 210 is a post that extends in a direction along the longitudinal axis 106 and parallel to the first rack engagement feature 206. The post may include a plurality of semi-circular ridges, and for example, three ridges on one side and two ridges on the other side. In an aspect, the first rack engagement feature 206 is the same as the second rack engagement feature 210. In other aspects, the first rack engagement feature 206 may be different than the second rack engagement feature 210.

Figure 6:
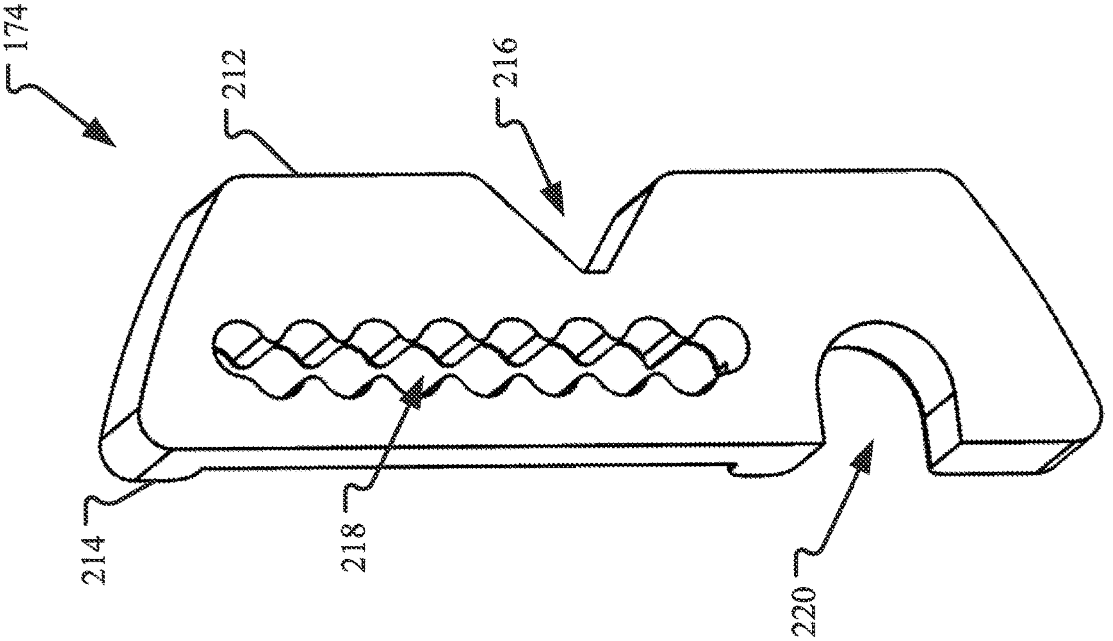
FIG. 6 is another perspective view of the first rack.
Figure 5:
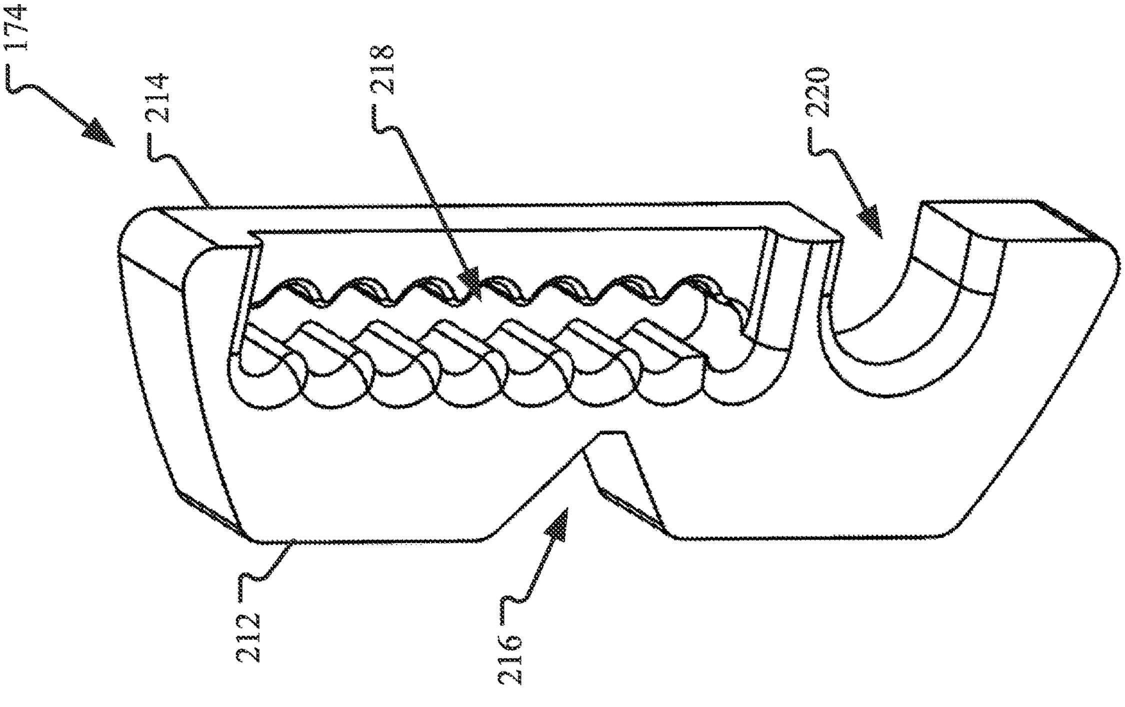
FIG. 5 is a perspective view of a first rack of the rekeyable lock cylinder shown in FIGS. 1 and 2.

FIGS. 5 and 6 are perspective views of the first rack 174. The first rack 174 has a first side 212 that faces the locking bar 176 (shown in FIG. 2) and an opposite second side 214 that faces the key follower 138 (shown in FIGS. 3 and 4). A locking bar engagement groove 216 is defined in the first side 212. The first side 212 above and below the locking bar engagement groove 216 is substantially planar. A first pin engagement feature 218 is defined proximate the second side 214. The first pin engagement feature 218 is configured to selectively engage with the key follower 138 and in a plurality of different positions. The first pin engagement feature 218 is configured to selectively engage with the first rack engagement feature 206 of the key follower 138. In the example, the first pin engagement feature 218 is a slot that is elongated in the top-bottom direction. The slot may include a plurality of semi-circular grooves on each side of the slot, and for example, the grooves on one side of the slot are offset from the grooves on the other side of the slot. The first side 212 also includes a groove 220 that corresponds to the protruding features 170 on the plug body 136 (shown in FIG. 2).

Figure 8:
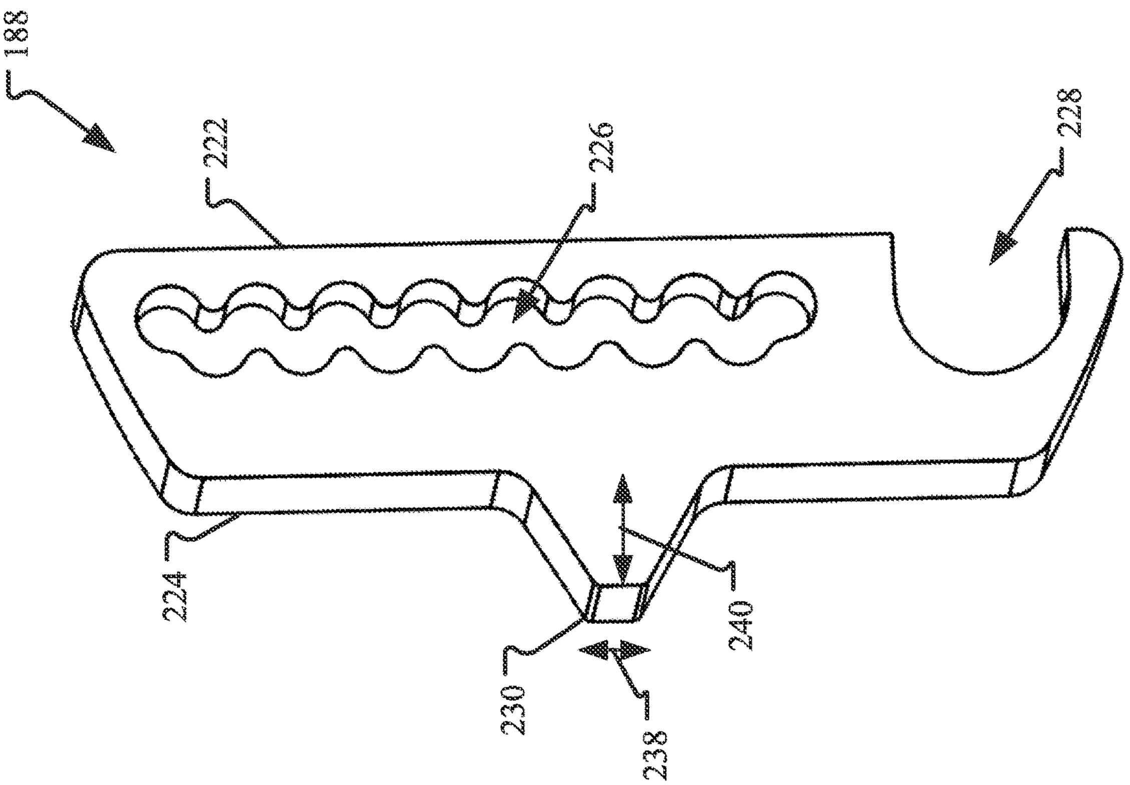
FIG. 8 is another perspective view of the second rack.
Figure 7:
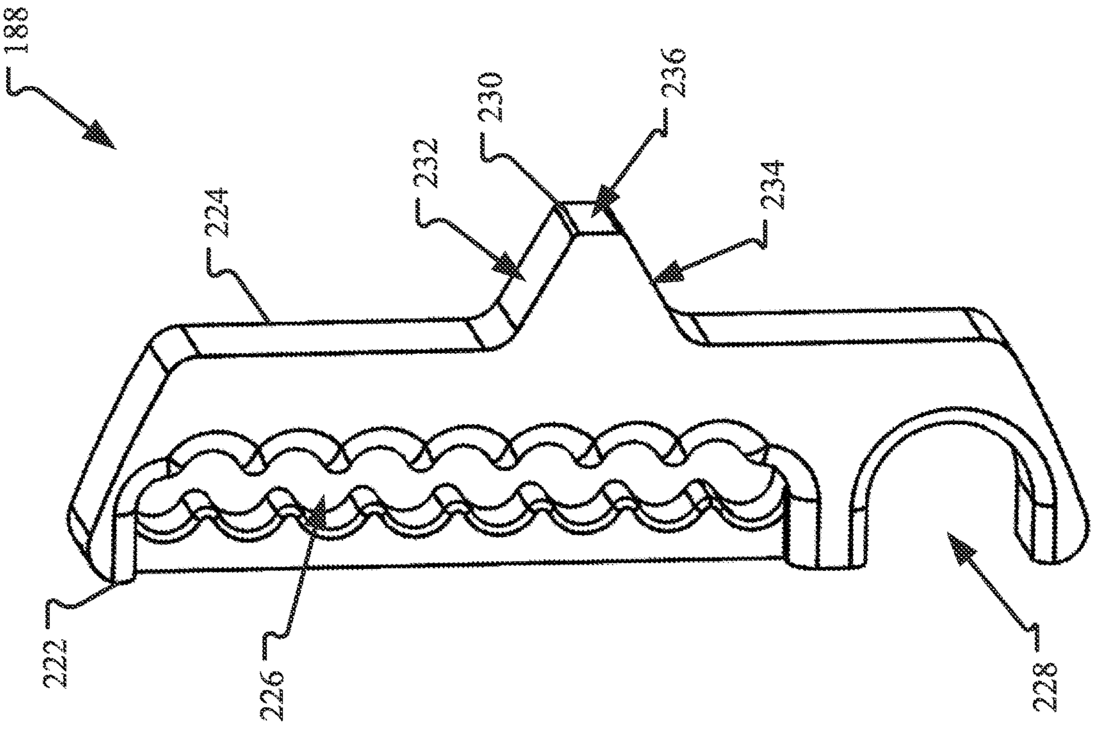
FIG. 7 is a perspective view of a second rack of the rekeyable lock cylinder shown in FIGS. 1 and 2.

FIGS. 7 and 8 are perspective views of the second rack 188. The second rack 188 has a first side 222 that faces the key follower 138 (shown in FIGS. 3 and 4) and an opposite second side 224 that faces the slider 190 (shown in FIG. 2). A second pin engagement feature 226 is defined proximate the first side 222. The second pin engagement feature 226 is configured to selectively engage with the second rack engagement feature 210 of the key follower 138. In the example, the second pin engagement feature 226 is a slot that is elongated in the top-bottom direction. The slot may include a plurality of semi-circular grooves on each side of the slot, and for example, the grooves on one side of the slot are offset from the grooves on the other side of the slot. The first side 222 also includes a groove 228 that corresponds to the protruding features 170 on the plug body 136 (shown in FIG. 2). A slider engagement feature 230 is defined in the second side 224. The slider engagement feature 230 is configured to engage with the slider 190. In the example, the slider engagement feature 230 is a single protruding lug. The lug can include a top camming surface 232 and a bottom camming surface 234 that taper towards each other at a stop surface 236. The stop surface 236 has a length 238 that engages with the slider 190 and block movement thereof. The stop surface 236 also extends a distance 240 from the first side 222 that corresponds to the sliding movement distance of the slider 190. The first side 222 above and below the slider engagement feature 230 is substantially planar.

Referring concurrently to FIGS. 3-8, the key follower 138 is configured to engage each rack 174, 188 in a plurality of bitting positions (e.g., the location at which the rack engagement feature of the key follower is coupled to the pin engagement feature of the racks for operation of the lock cylinder as described herein). The term "bitting position" is referred to as a depth of a key cut in a bitting sequence of a key. The bitting position is typically identified by a digit or letter that indicates a depth of a key cut, and thereby, corresponds to the position of the rack with respect to the key follower such that movement of the key follower within the lock cylinder from the key positions the rack in a operable position. In the example, the bitting position of the first rack 174 is different than the bitting position of the second rack 188 as a user key is different than a master key. It is appreciated, that while one example of rack engagement features and pin engagement features is illustrated, one of ordinary skill in the art understands that other types of pin-rack engagement structures can be utilized. U.S. Patent Application Publication No. 2022/0213716A1, dated Jul. 7, 2022, describes other examples of pin-rack engagement structures and is incorporated by reference herein in its entirety.

In the example, the first pin engagement feature 218 of the first rack 174 is the same as the second pin engagement feature 226 of the second rack 188. In other examples, the first pin engagement feature 218 of the first rack 174 may be different than the second pin engagement feature 226 of the second rack 188. That is, the structural configuration of how the key follower 138 engages with each rack 174, 188 may be different between the racks and use of different engagement features on different sides of the key follower 138 is contemplated herein. Because the first rack 174 includes the locking bar engagement groove 216 and the second rack 188 includes the slider engagement feature 230, the first rack 174 may also have different engagement features than the second rack 188.

Figure 9:
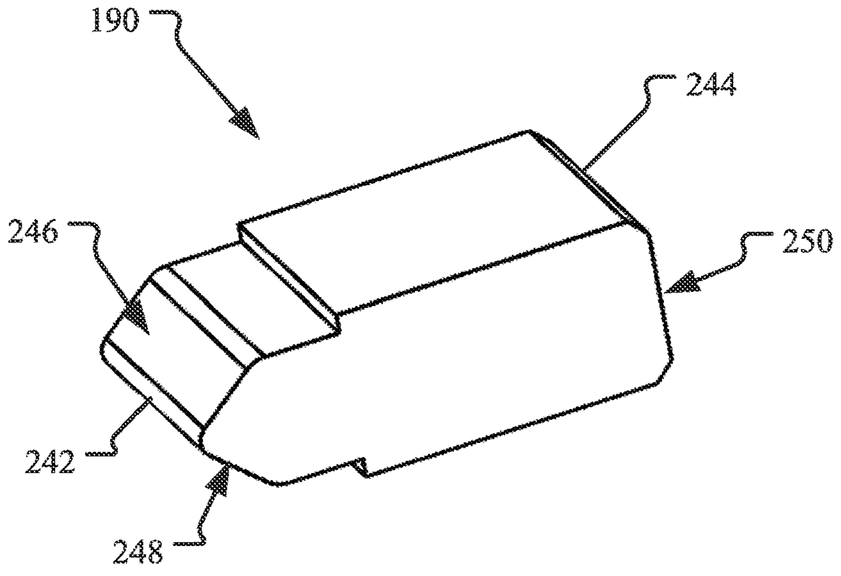
FIG. 9 is a perspective view of a slider of the rekeyable lock cylinder shown in FIGS. 1 and 2.

FIG. 9 is a perspective view of the slider 190. The slider 190 includes a first end 242 and an opposite second end 244. The first end 242 includes a tapered nose with upper and lower camming surfaces 246, 248 and is configured to engage with the slider engagement feature 230 of the second rack 188 (shown in FIGS. 7 and 8). The second end 244 has a squared end with a planar surface 250 and is configured to engage with the pin 120 of the cylinder assembly 102 and the pin openings 130 of the inner sleeve 126 (all shown in FIG. 2).

Figure 10:
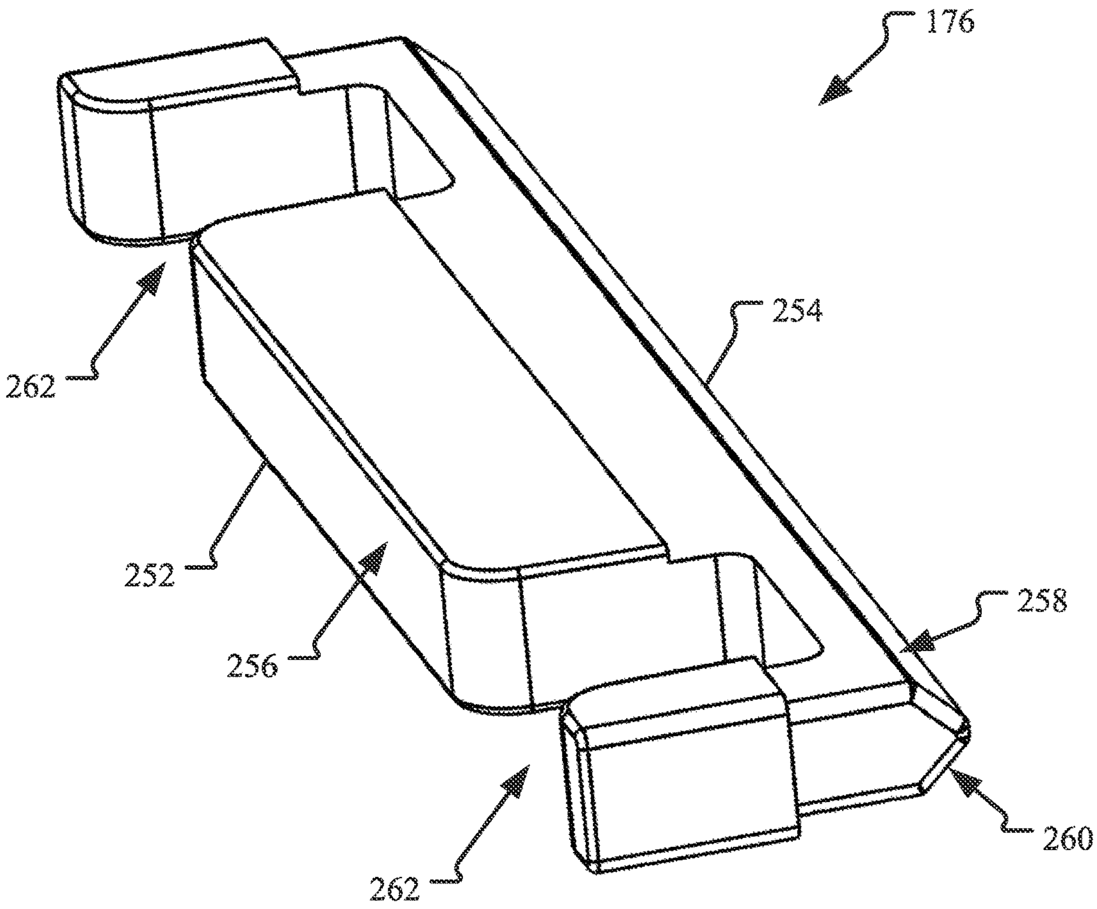
FIG. 10 is a perspective view of a locking bar of the rekeyable lock cylinder shown in FIGS. 1 and 2.

FIG. 10 is a perspective view of the locking bar 176. The locking bar 176 includes a first end 252 and an opposite second end 254. The first end 252 has a squared end with a planar surface 256 and is configured to engage with the slot 128 of the inner sleeve (shown in FIG. 2). The second end 254 includes a tapered nose with upper and lower camming surfaces 258, 260 and is configured to engage with the locking bar engagement groove 216 of the first rack 174

(shown in FIGS. 5 and 6). The locking bar 176 also includes a pair of notches 262 for at least partially supporting the biasing member 182 (shown in FIG. 2).

Figure 11:
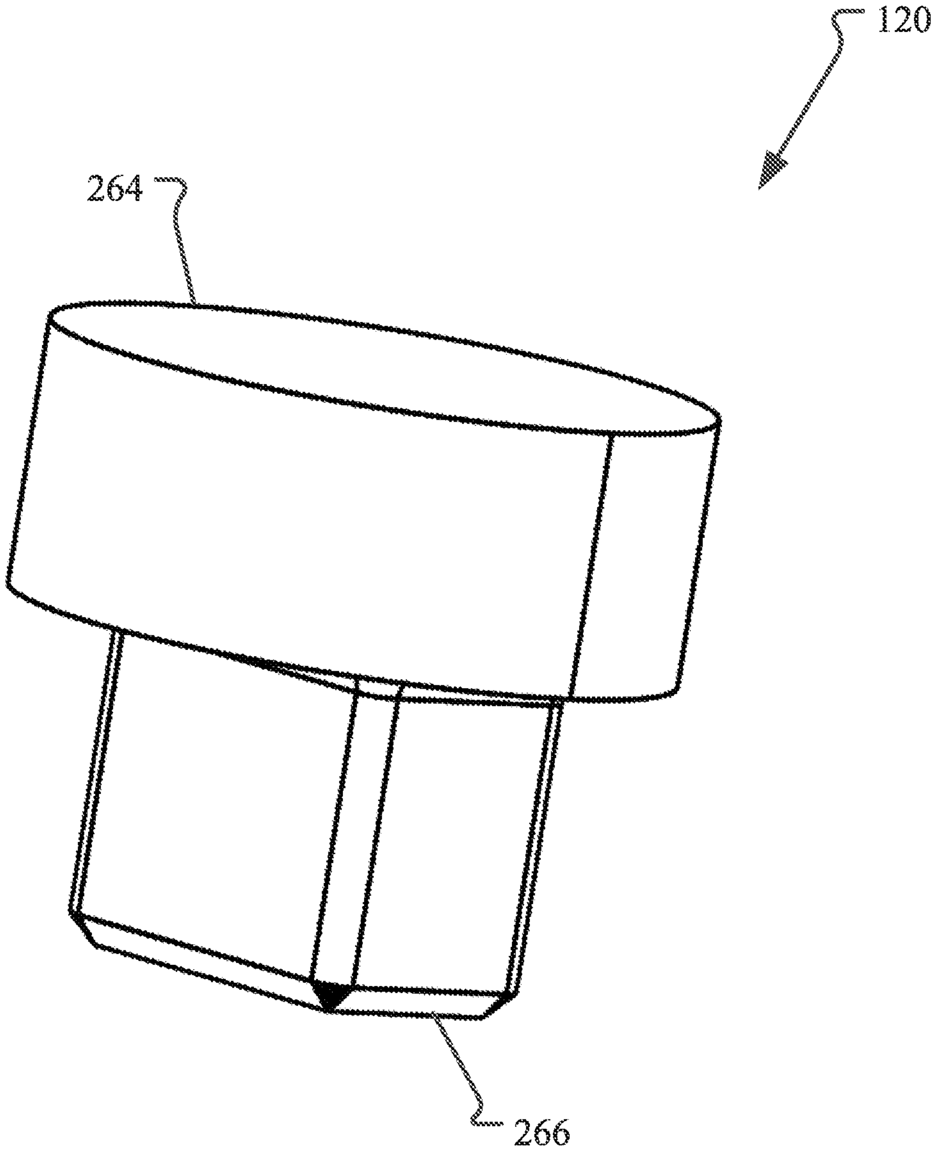
FIG. 11 is a perspective view of a pin of the rekeyable lock cylinder shown in FIGS. 1 and 2.

FIG. 11 is a perspective view of the pin 120. The pin 120 has a first end 264 having an enlarged cylindrical head and a second end 266 having a rectangular shape. The first end 264 is disposed within the cylinder body 104 and positioned against the biasing member 122 (both shown in FIG. 2). The second end 266 is configured to engage with the slider 190 and the pin openings 130 of the inner sleeve 126 (all shown in FIG. 2).

Figure 12:
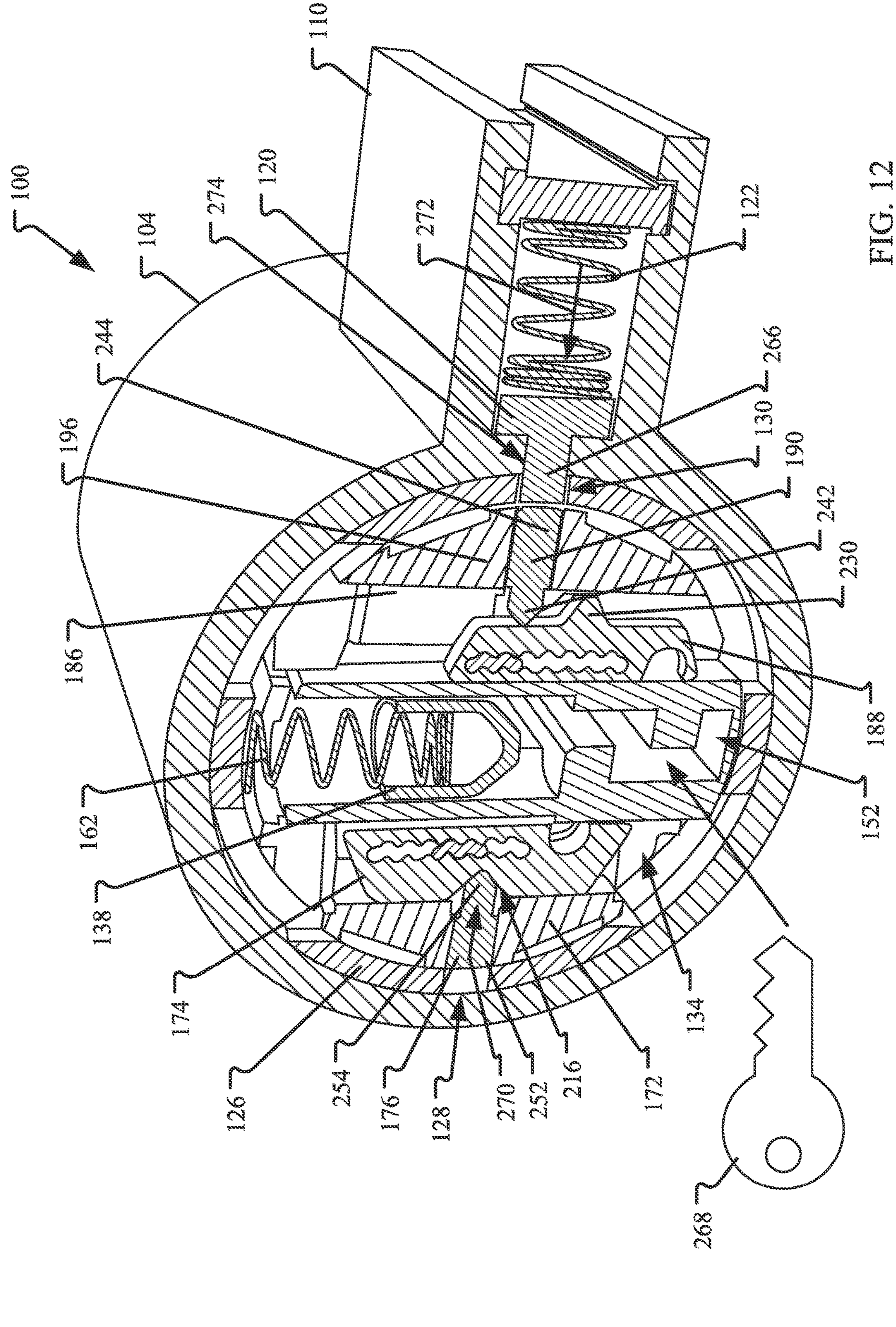
FIG. 12 is a cross-sectional, perspective view of the rekeyable lock cylinder shown in FIGS. 1 and 2 and upon receipt of a valid user key.

FIG. 12 is a cross-sectional, perspective view of the rekeyable lock cylinder 100 and upon receipt of a valid user key 268. When the valid user key 268 is received within the keyway opening 152 of the rekeyable lock cylinder 100, the rekeyable lock cylinder 100 is unlocked such that plug assembly 134 is allowed to rotate within the inner sleeve 126 and turn the torque blade attached thereto. The first rack 174 is coupled to the key follower 138 such that the bitting position of the valid user key 268 positions the key follower 138, and thus the first rack 174, at a position within the first carrier 172 that aligns the locking bar engagement groove 216 with the second end 254 of the locking bar 176. Because the locking bar 176 is inwardly biased 270 towards the first rack 174, the second end 254 slides into the locking bar engagement groove 216 a distance that corresponds to the first end 252 of the locking bar 176 being moved out of engagement with the slot 128 of the inner sleeve 126. As illustrated in FIG. 12, the locking bar 176 is disposed in an unlocked position which facilitates the plug assembly 134 being rotatable relative to the inner sleeve 126. The locking bar 176 is biased toward the unlocked position. The operational engagement of the locking bar and the first rack is similar to that described in U.S. Pat. No. 10,612,271 B2, dated Apr. 7, 2020 and which is incorporated by reference in its entirety.

The bitting position of the valid user key 268 also positions the second rack 188 at a position within the second carrier 186. This position of the second rack 188, however, misaligns the slider engagement feature 230 from the slider 190. As such, the first end 242 of the slider 190 is positioned against the second side 224 of the second rack 188 and either above or below the slider engagement feature 230. The second end 244 of the slider 190 is positioned within the second carrier 186 and inside of the inner sleeve 126 and so that the plug assembly 134 can rotate with respect to the inner sleeve 126 due to the unlocking of the locking bar 176 described above. In the example, this position of the slider 190 is an unblocked position. In the unblocked position, the slider 190 is disposed completely within the second carrier 186 and the holes 196 therein.

When the locking bar 176 is in the unlocked position and the slider 190 is in the unblocked position, the inner sleeve 126 is prevented from rotating within the cylinder body 104 by the pin 120 being in an engaged position. The pin 120 is biased 272 radially inwardly towards the engaged position by the biasing member 122 urging the second end 266 of the pin 120 through a pin opening 274 defined in the cylinder body 104 and into the pin opening 130 of the inner sleeve 126. This position of the pin 120 prevents the second end 244 of the slider 190 from moving into the pin opening 130 of the inner sleeve 126 and facilitates rotation of the plug assembly 134 within the inner sleeve 126 and the cylinder body 104. In the example, the biasing direction 272 of the pin 120 is opposing the biasing direction 270 of the locking bar 176. The slider 190, however, is not directly biased with a biasing member within the hole 196 of the second carrier 186. Rather, the pin 120 and the biasing member 122 disposed in the cylinder body 104 are utilized to bias the pin 120 inward so that the slider 190 is urged towards the second rack 188. In an example, the pin 120 is biased in a direction towards the inner sleeve 126 and towards the plug assembly 134.

Figure 13:
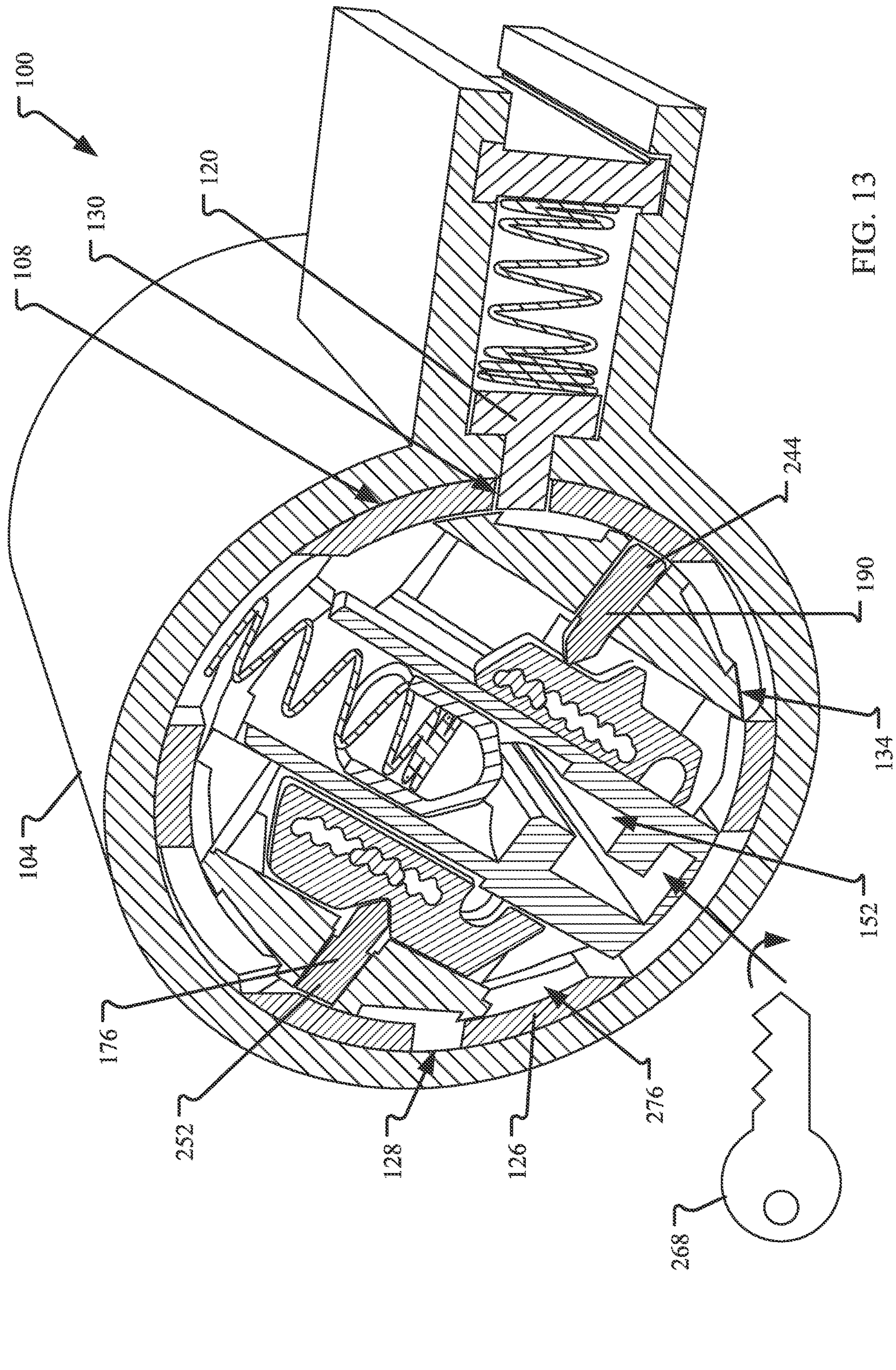
FIG. 13 is a cross-sectional, perspective view of the rekeyable lock cylinder shown in FIG. 12 and with a plug assembly rotated therein.

Turning now to FIG. 13 which is a cross-sectional, perspective view of the rekeyable lock cylinder 100 with the plug assembly 134 rotated therein. With the locking bar 176 positioned in the unlocked position and within the inner sleeve 126 and the slider 190 positioned in the unblocked position and within the inner sleeve 126, the plug assembly 134 is allowed to rotate and so as to operate the attached torque blade. During rotation of the plug assembly 134, the first end 252 of the locking bar 176 is configured to slide along an inner surface 276 of the inner sleeve 126. Additionally, the second end 244 of the slider 190 is configured to slide along the inner surface 276 of the inner sleeve 126. The pin 120 is engaged with the inner sleeve 126 so that the inner sleeve 126 is prevented from rotating within the cylinder body 104 when the valid user key 268 is used.

The rekeyable lock cylinder 100 defines two shear planes for operation of the lock cylinder. A first shear plane is defined between the inner surface 276 of the inner sleeve 126 and an outer surface of the plug assembly 134. A second shear plane is defined between the inner surface 108 of the cylinder body 104 and an outer surface of the inner sleeve 126. When the valid user key 268 is inserted into the keyway opening 152, the locking bar 176 and the slider 190 are positioned inward from the first shear plane so that no lock components extend through the first shear plane and rotation between the plug assembly 134 and the inner sleeve 126 is enabled. However, the pin 120 is disposed within the second shear plane such that the inner sleeve 126 is prevented relative to the cylinder body 104.

Figure 14:
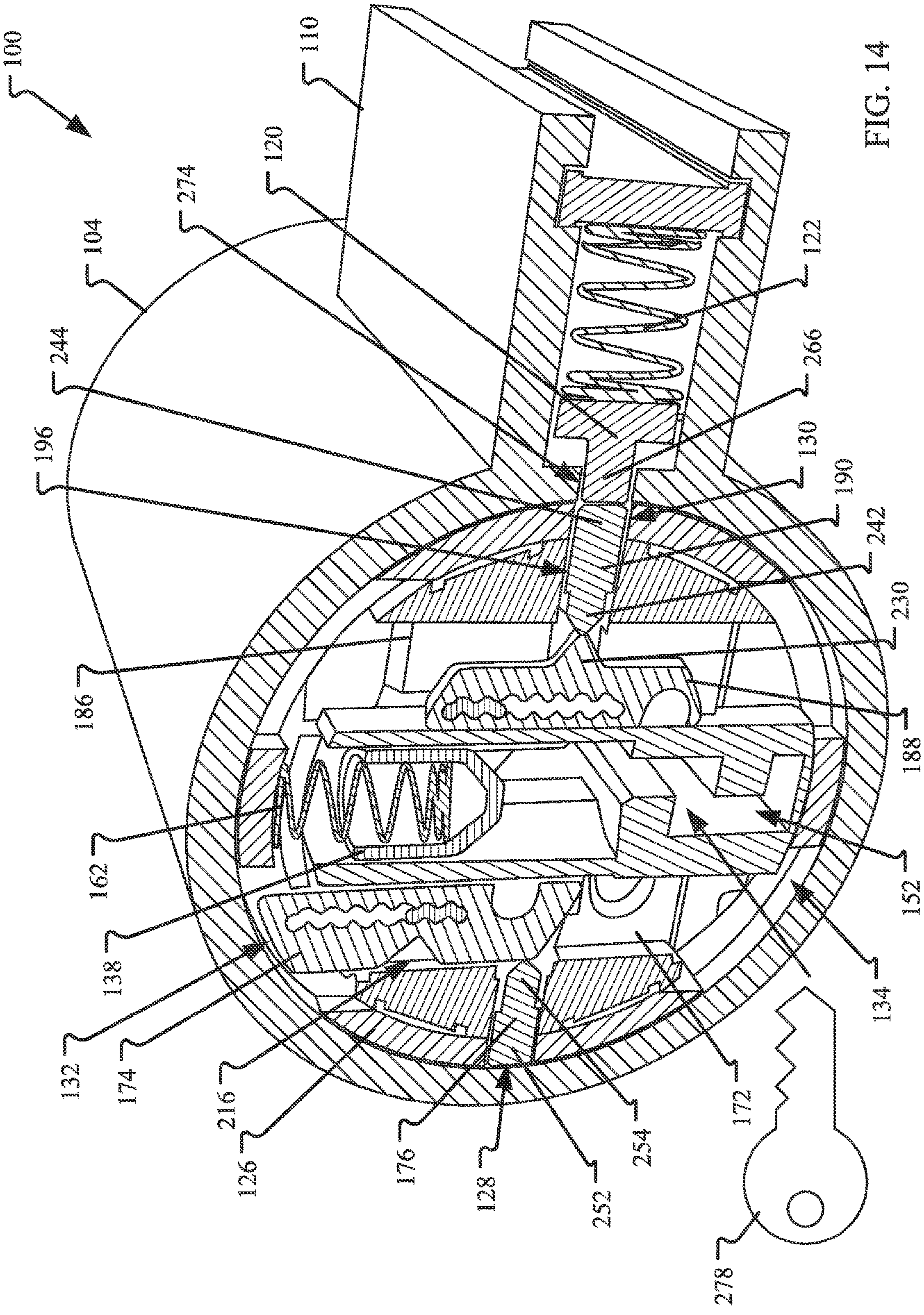
FIG. 14 is a cross-sectional, perspective view of the rekeyable lock cylinder shown in FIGS. 1 and 2 and upon receipt of a valid master key.

FIG. 14 is a cross-sectional, perspective view of the rekeyable lock cylinder 100 and upon receipt of a valid master key 278. When the valid master key 278 is received within the keyway opening 152 of the rekeyable lock cylinder 100, the rekeyable lock cylinder 100 is unlocked such that plug assembly 134 and the inner sleeve 126 are allowed to rotate together within the cylinder body 104 and turn the torque blade attached thereto. The first rack 174 is coupled to the key follower 138 such that the bitting position of the valid master key 278 positions the key follower 138, and thus the first rack 174, at a position within the first carrier 172 that misaligns the locking bar engagement groove 216 with the second end 254 of the locking bar 176. As such, the second end 254 of the locking bar 176 is positioned against the first side 212 of the first rack 174 and either above or below the locking bar engagement groove 216. The first end 252 of the locking bar 176 is positioned within the slot 128 of the inner sleeve 126 so that the plug assembly 134 is engaged with the inner sleeve 126, and the plug assembly 134 and the inner sleeve 126 cannot rotate independently. In this example, this position of the locking bar 176 is a locked position. In the locked position, the locking bar 176 is disposed at least partially within the slot 128 to block rotation of the plug assembly 134 relative to the inner sleeve 126.

The bitting position of the valid master key 278 also positions the second rack 188 at a position within the second carrier 186. This position of the second rack 188, however, aligns the slider engagement feature 230 with the slider 190. Because the slider 190 can move within the hole 196 of the second carrier 186 and the slider 190 is aligned with the pin opening 130 of the inner sleeve 126, the second end 244 of the slider 190 slides into the pin opening 130 a distance that corresponds to the first end 242 of the slider 190 being moved by the slider engagement feature 230. As illustrated in FIG. 14, the slider 190 is disposed in a blocked position which facilitates the plug assembly 134 being engaged with the inner sleeve 126 and rotatable therewith.

When the locking bar 176 is in the locked position and the slider 190 is in the blocked position, the inner sleeve 126 is coupled to the plug assembly 134 and both are rotatable within the cylinder body 104 because the pin 120 is moved towards a disengaged position. Movement of the slider 190 towards the blocked position, overcomes the biasing force of the pin 120 and the pin 120 slides out of engagement with the pin opening 130 of the inner sleeve 126. As such, the second end 266 of the pin 120 no longer engages with the inner sleeve 126 and is disposed completely within the cylinder body 104. The inner sleeve 126 may then rotate relative to the cylinder body 104 with the plug assembly 134 engaged with the inner sleeve 126.

As shown in FIG. 14, the circumferential slits 132 of the inner sleeve 126 are aligned with the racks 174, 188. This configuration allows for either the top or the bottom of the racks 174, 188 to move at least partially within the circumferential slit 132 depending on the bitting position and the location of the key follower 138. For example, in FIG. 14 the key follower 138 is engaged with the lowermost portion of the pin engagement feature of the first rack 174 while the key follower 138 is engaged with the uppermost portion of the pin engagement feature of the second rack 188. Thus, the rekeyable lock cylinder 100 has bitting positions that allow at least a portion of the top of the first rack 174 to slide within the circumferential slit 132 of the inner sleeve 126 when the valid master key 278 is within the keyway opening 152. Similarly, there may be bitting positions that may allow the bottom of the first rack 174 to slide within the circumferential slits 132 of the inner sleeve 126 when the valid master key 278 is inserted into the keyway opening 152. When no key is inserted into the keyway opening 152, the key follower 138 may be biased such that the top of the second rack 188 or the bottom of the second rack 188 are slid within the circumferential slit 132 of the inner sleeve 126. Notably, only bitting positions of the valid master key 278 enable these uppermost and lowermost positions of the first rack 174 because the plug assembly 134 is locked for rotational movement with the inner sleeve 126. Bitting positions of the valid user key 268 (shown in FIGS. 12 and 13) cannot use these upper most and lowermost positions of the second racks 188 because the plug assembly 134 must rotate independently from the inner sleeve 126 and the racks 174, 188 cannot be positioned within the first shear plane. When no key is inserted, one or both of the racks 174, 188 may be positioned across the first shear plane because the plug assembly 134 is not configured to rotate without a valid key inserted therein.

Figure 15:
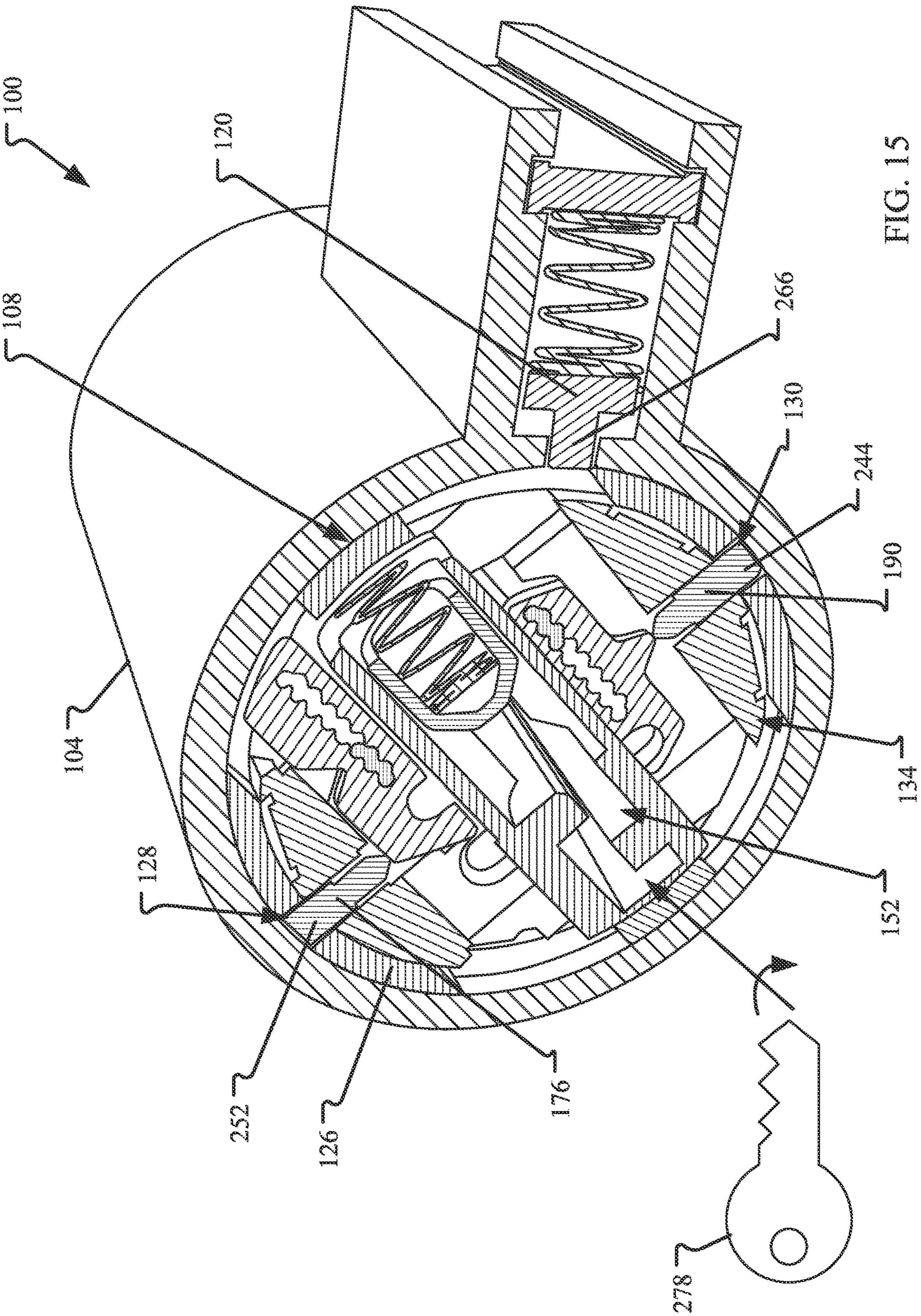
FIG. 15 is a cross-sectional, perspective view of the rekeyable lock cylinder shown in FIG. 14 and with a plug assembly and inner sleeve rotated therein.

Turning now to FIG. 15 which is a cross-sectional, perspective view of the rekeyable lock cylinder 100 with the plug assembly 134 and the inner sleeve 126 rotated therein. With the locking bar 176 positioned in the locked position and engaged with the inner sleeve 126 and the slider 190 positioned in the blocked position and engaged with the inner sleeve 126, the plug assembly 134 and the inner sleeve 126 are allowed to rotate and so as to operate the attached torque blade. During rotation of the plug assembly 134 and the inner sleeve 126, the first end 252 of the locking bar 176 is configured to slide along the inner surface 108 of the cylinder body 104. Additionally, the second end 244 of the slider 190 is configured to slide along the inner surface 108 of the cylinder body 104. The pin 120 is disengaged with the inner sleeve 126 so that the second end 266 slides against the outer surface of the inner sleeve 126 when the valid master key 278 is used. With use of the valid master key 278, both the locking bar 176 and the slider 190 extend across the first shear plane, while no lock components extend across the second shear plane, and so that rotation of the plug assembly 134 and the inner sleeve 126 is enabled.

Referring concurrently to FIGS. 12-15, both the first rack 174 and the second rack 188 translate within the plug assembly 134 when the valid user key 268 and the valid master key 278 are received within the keyway opening 152. The racks 174, 188 are axially aligned within the plug assembly 134. When the valid user key 268 is inserted, the first rack 174 aligns with the locking bar 176 while the second rack 188 misaligns from the slider 190. When the valid master key 278 is inserted, the first rack 174 misaligns from the locking bar 176 while the second rack 188 aligns with the slider 190. Because of the use of the inner sleeve 126, the configuration of the plug assembly 134 allows both a user key and a master key to operate the rekeyable lock cylinder 100. In contrast, other known locks with double racks, such as U.S. Pat. No. 11,220,840 B1, dated Jan. 11, 2022, and which is incorporated by reference herein in its entirety, move double racks in order to align with separate locking bars and allow a single key to operate the lock cylinder.

Additionally, because of the chimney 110 that houses the pins 120 and the pins 120 are configured to selectively engage the pin openings 130 of the inner sleeve 126 which are orthogonal to the keyway opening 152, the chimney 110 is also oriented orthogonal to the keyway opening 152 when the plug assembly 134 is in a home position. This is for the pins 120 to engage with the master key carrier subassembly 142.

In an aspect, the valid user key 268 and the valid master key 278 have similar key sizes (but not key cuts). In other aspects, the valid user key 268 and the valid master key 278 may have different key sizes, however, the keyway opening 152 is configured to enable receipt and operation of both keys 268, 278. By using different key sizes, the user and master key system may be further facilitated. Additionally, a larger master key may be utilized to retain the master key within the plug assembly when rotated. Furthermore, the user key cannot define any bitting position that matches with the master key as then this user key would not be able to operate the rekeyable lock cylinder 100 as at least one of the sliders 190 would be engaged with the inner sleeve 126.

Figure 16:
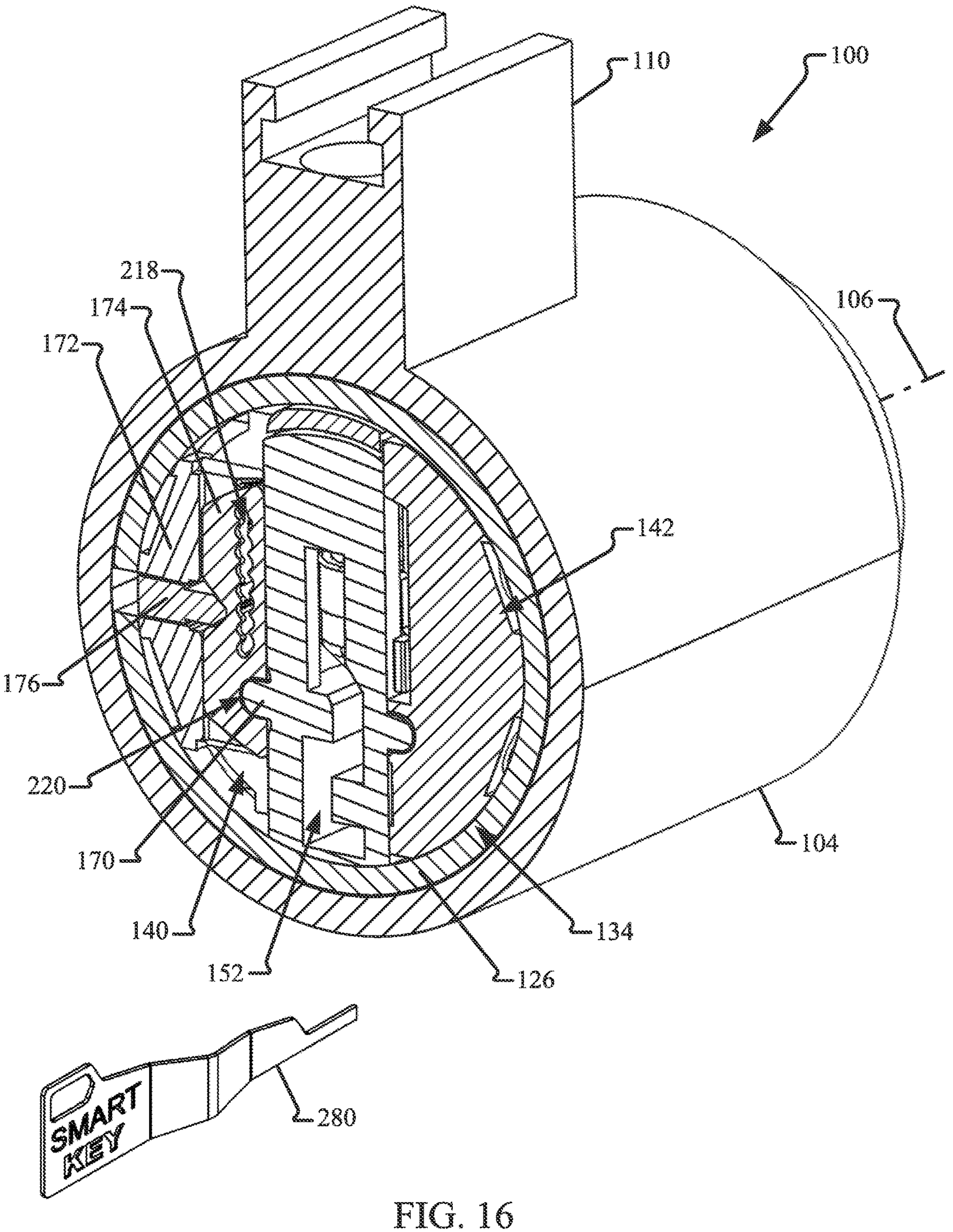
FIG. 16 is a cross-sectional, perspective view of the rekeyable lock cylinder shown in FIGS. 1 and 2 and in a first rekeying configuration.

FIG. 16 is a cross-sectional, perspective view of the rekeyable lock cylinder 100 in a first rekeying configuration. The user key carrier subassembly 140 is also configured to allow for the rekeyable lock cylinder 100 to be rekeyed without needing to extract the plug assembly 134 from the inner sleeve 126 and the cylinder body 104. In order to rekey the user key carrier subassembly 140, a valid user key is inserted into the keyway opening 152 and the plug assembly 134 is rotated to a first or learn position. As illustrated in FIG. 16, the first position is about 90° from a home position of the plug assembly 134. Because the valid user key is used, the grooves 220 of the first racks 174 are aligned with the position of the protruding features 170. A first tool 280 is inserted into the first rekeying tool opening 156 (shown in FIG. 1) so as to push on the first carrier 172 and move the entire user key carrier subassembly 140 towards the drive portion 146 of the plug body 136 (shown in FIG. 2) along the longitudinal axis 106.

As the user key carrier subassembly 140 moves along the longitudinal axis, the first spring catch 180 (shown in FIG. 2) moves into one or more detent recess (not shown) within the inner surface 108 of the cylinder body 104 so that the user key carrier subassembly 140 is captured in the rotated and translated position within the inner sleeve 126 and the cylinder body 104 (e.g., the first rekeying configuration). Moving the first carrier 172 along the longitudinal axis 106, withdraws the first rack engagement features 206 of the key followers 138 (shown in FIGS. 3 and 4) from the first pin engagement features 218 of the first racks 174 in a longitudinal direction, parallel to the longitudinal axis 106. The valid user key is then removed and a second user key is inserted into the keyway opening 152 and used to rotate the plug assembly 134 back towards the home position and release the first spring catch 180. As the first spring catch 180 leaves the detent recess of the cylinder body 104, the first carrier 172 is biased towards the plug face 144 by the first return spring 178 (both shown in FIG. 2), causing the first rack engagement features 206 of the key followers 138 to insert into the first pin engagement features 218 of the first racks 174 in a longitudinal direction, parallel to the longitudinal axis 106. At this point, the rekeyable lock cylinder 100 is keyed to the second (now valid) key and the first key no longer facilitates operation of the rekeyable lock cylinder 100. This rekeying operation is described in further detail in U.S. Pat. No. 8,656,747 B2, dated Feb. 25, 2014, and which is incorporated by reference in its entirety.

Figure 17:
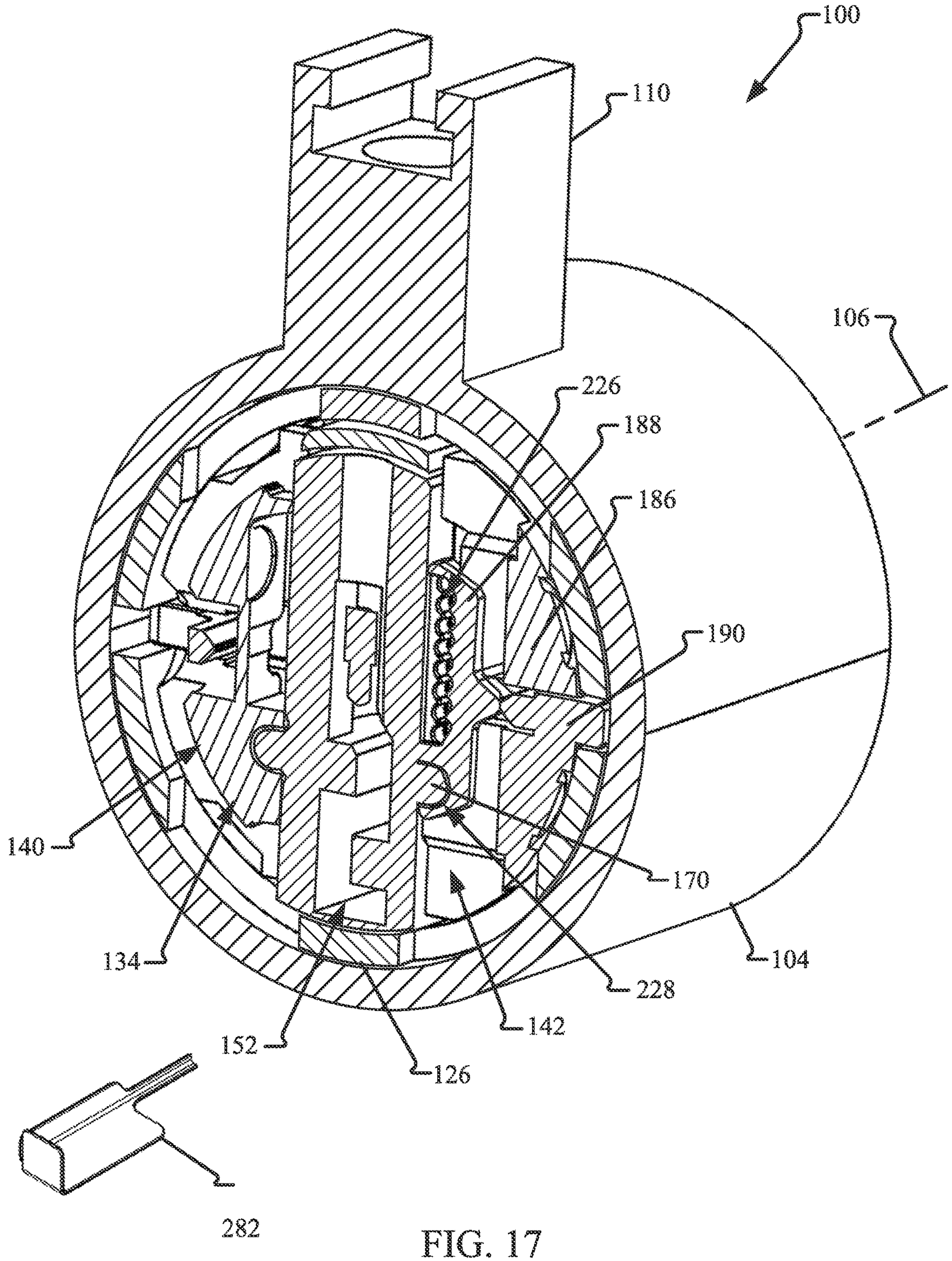
FIG. 17 is a cross-sectional, perspective view of the rekeyable lock cylinder shown in FIGS. 1 and 2 and in a second rekeying configuration.

FIG. 17 is a cross-sectional, perspective view of the rekeyable lock cylinder 100 in a second rekeying configuration. The master key carrier subassembly 142 is also configured to allow for the rekeyable lock cylinder 100 to be rekeyed without needing to extract the plug assembly 134 and the inner sleeve 126 from the cylinder body 104. In order to rekey the master key carrier subassembly 142, a valid master key is inserted into the keyway opening 152 and the plug assembly 134 and the inner sleeve 126 are rotated to a first or learn position. As illustrated in FIG. 17, the first position is about 90° from a home position of the plug assembly 134 and the inner sleeve 126. Because the valid master key is used, the grooves 228 of the second racks 188 are aligned with the position of the protruding features 170. A second tool 282 is inserted into the second rekeying tool opening 158 (shown in FIG. 1) so as to push on the second carrier 186 and move the entire master key carrier subassembly 142 and the inner sleeve 126 towards the drive portion 146 of the plug body 136 (shown in FIG. 2) along the longitudinal axis 106.

As the master key carrier subassembly 142 moves along the longitudinal axis, the second spring catch 194 (shown in FIG. 2) moves into one or more detent recess (not shown) within the inner surface 108 of the cylinder body 104 so that the master key carrier subassembly 142 and inner sleeve 126 are captured in the rotated and translated position within the cylinder body 104 (e.g., the second rekeying configuration). Moving the second carrier 186 along the longitudinal axis 106, withdraws the second rack engagement features 210 of the key followers 138 (shown in FIGS. 3 and 4) from the second pin engagement features 226 of the second racks 188 in a longitudinal direction, parallel to the longitudinal axis 106. The valid master key is then removed and a second master key is inserted into the keyway opening 152 and used to rotate the plug assembly 134 and the inner sleeve 126 back towards the home position and release the second spring catch 194. As the second spring catch 194 leaves the detent recess of the cylinder body 104, the second carrier 186 is biased towards the plug face 144 by the second return spring 192 (both shown in FIG. 2), causing the second rack engagement features 210 of the key followers 138 to insert into the second pin engagement features 226 of the second racks 188 in a longitudinal direction, parallel to the longitudinal axis 106. At this point, the rekeyable lock cylinder 100 is keyed to the second (now valid) key and the first key no longer facilitates operation of the rekeyable lock cylinder 100.

Referring concurrently to FIGS. 16 and 17, the first tool 280 is different in size and/or shape than the second tool 282 and so that rekeying the user key requires a different tool than rekeying the master key. For example, the first tool 280 has an elongated plate shape, while the second tool 282 has an elongated L-shape. In other examples, the first tool 280 and the second tool 282 may be substantially similar and such that rekeying the user key and the master key can be performed with the same tool. In other examples, the rekeyable lock cylinder 100 may be configured with tool-less rekeying capabilities like the configurations described in U.S. Pat. No. 8,099,988, dated Jan. 24, 2012, and U.S. Pat. No. 11,319,726, dated May 3, 2022, and which are incorporated by reference in their entireties.

Figure 18:
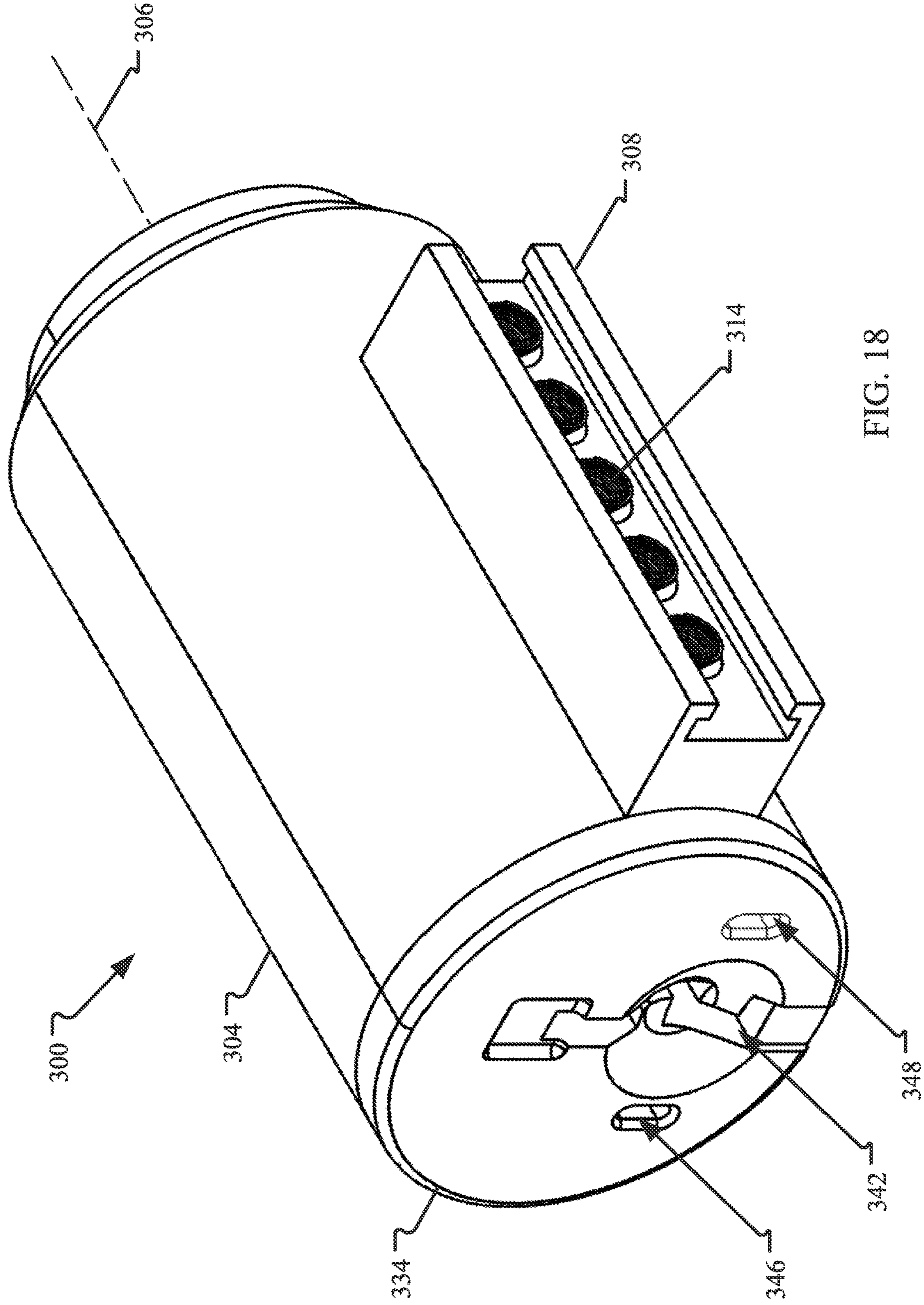
FIG. 18 is a perspective view of another exemplary rekeyable lock cylinder according to another embodiment of this disclosure.
Figure 19:
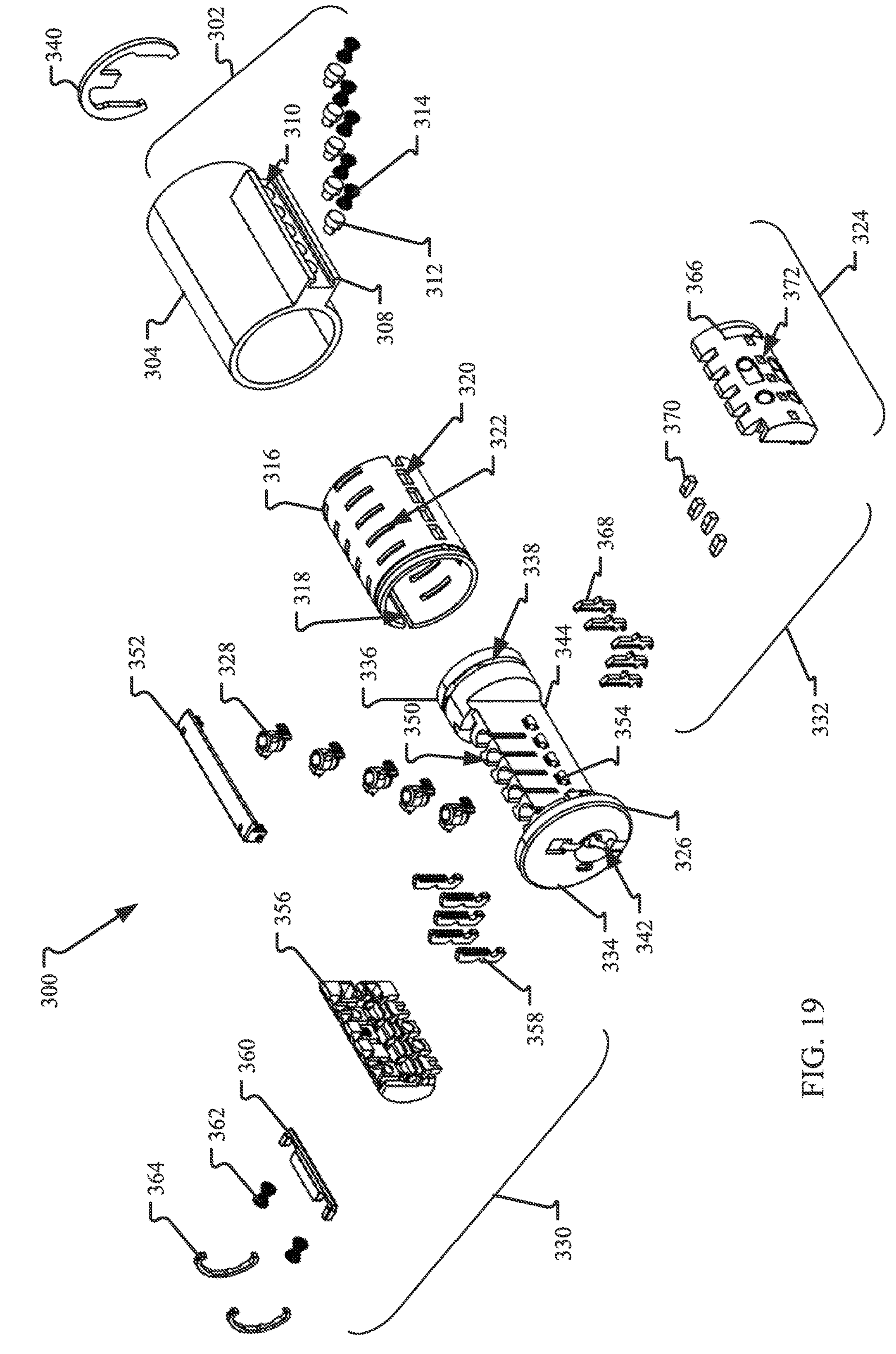
FIG. 19 is a perspective, exploded view of the rekeyable lock cylinder shown in FIG. 18.

FIG. 18 is a perspective view of another exemplary rekeyable lock cylinder 300. FIG. 19 is a perspective, exploded view of the rekeyable lock cylinder 300. Referring concurrently to FIGS. 18 and 19, the rekeyable lock cylinder 300 is configured to be operable with use of both a user key and a master key, as well as facilitate rekeying of the user key and the master key without removal of the rekeyable lock cylinder 300 and similar to the rekeyable lock cylinder 100 described above. As such, only the differences between the two embodiments will be highlighted below.

The rekeyable lock cylinder 300 includes a cylinder assembly 302 having a cylinder body 304 defining a longitudinal axis 306. The cylinder body 304 is substantially cylindrical in shape and hollow with a radially extending chimney 308. A plurality of channels 310 are defined by the chimney 308. A pin 312 is slidably mounted within the channel 310 of the chimney 308. The pin 312 is biased by a biasing member 314 (e.g., a compression spring). An inner sleeve 316 is disposed within the cylinder body 304 and defines a slot 318, a plurality of pin openings 320, and a plurality of circumferential slits 322. The inner sleeve 316 is similar to the inner sleeve described above and is described in further detail below in reference to FIG. 20.

A plug assembly 324 is disposed at least partially within the inner sleeve 316 and the cylinder body 304. The plug assembly 324 includes a plug body 326 supporting a plurality of key followers 328 (e.g., spring loaded pins), a user key carrier subassembly 330, and a master key carrier subassembly 332. The plug body 326 includes a plug face 334 and an opposite drive portion 336. The drive portion 336 includes a circumferential recess 338 for receiving at least a portion of a retainer clip 340. The plug face 334 defines a keyway opening 342 that extends into an intermediate portion 344 and also defines a first rekeying tool opening 346 and a second rekeying tool opening 348. In this example, the first rekeying tool opening 346 and the second rekeying tool opening 348 have similar sizes and/or shapes.

The intermediate portion 344 has a plurality of channels 350 and the key followers 328 are slidably mounted within the channels 350 and are biased with a biasing member (not shown) retained by a retaining cap 352. Each planar side of the intermediate portion 344 includes a plurality of bullet-shaped protruding features 354 that facilitate rekeying. The user key carrier subassembly 330 includes a first carrier 356, a plurality of first racks 358, and a locking bar 360. The first carrier 356 is selectively slidable along the longitudinal axis 306 for rekeying with a first return spring (not shown). Additionally, a first spring catch (not shown) is provided for the first carrier 356 for rekeying. The locking bar 360 is biased with a pair of biasing members 362 which are retained on the first carrier 356 by a pair of clips 364. The master key carrier subassembly 332 includes a second carrier 366, a plurality of second racks 368, and a plurality of sliders 370. The second carrier 366 is selectively slidable along the longitudinal axis 306 for rekeying between different master keys and is biased with a second return spring (not shown). Additionally, a second spring catch (not shown) is provided for the second carrier 366 for rekeying. The sliders 370 are slidably mounted within a plurality of holes 372 defined within the second carrier 366.

Figure 20:
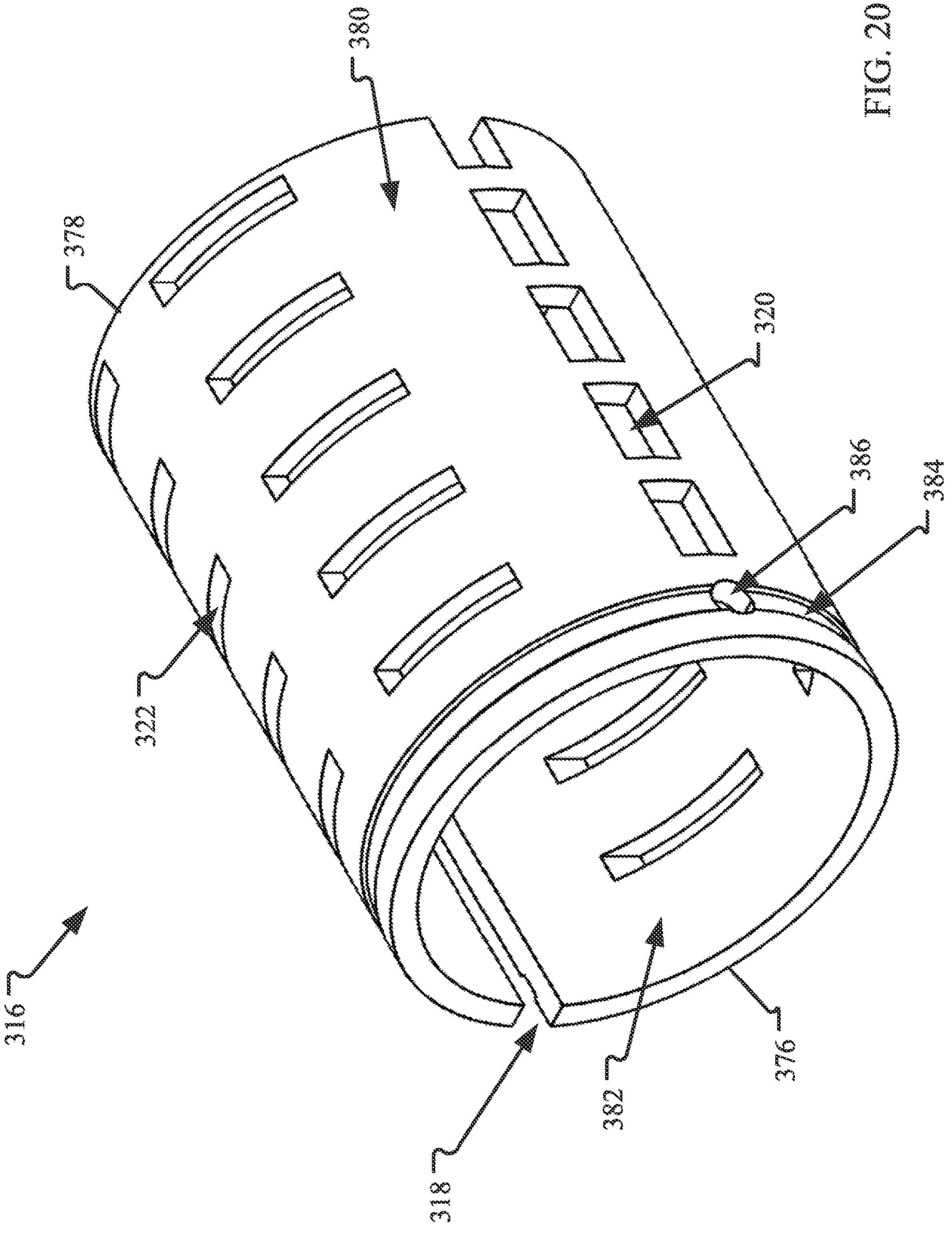
FIG. 20 is a perspective view of an inner sleeve of the rekeyable lock cylinder shown in FIGS. 18 and 19.

FIG. 20 is a perspective view of the inner sleeve 316 and is the same or similar to the inner sleeve 126 described above. The inner sleeve 316 has a first end 376 and an opposite second end 378 that extends along the longitudinal axis. The inner sleeve 316 is substantially cylindrical in shape and hollow. An outer surface 380 faces an inner surface of the cylinder body 304 (shown in FIG. 19) and slides against. An inner surface 382 faces the plug assembly 324 (shown in FIG. 19) and slides against. The slot 318 extends the entire length of the inner sleeve 316 from the first end 376 to the second end 378. The slot 318 is shaped and sized to receive at least a portion of the locking bar 360 (shown in FIG. 19). Radially opposite of the slot 318, the pin openings 320 extends through the inner sleeve 316. In contrast to the slot 318, the pin openings 320 are discrete within the inner sleeve 316 and longitudinally spaced apart from one another. The pin openings 320 are shaped and sized to receive at least a portion of the sliders 370 (shown in FIG. 19). The circumferential slits 322 circumferentially aligned with the pin openings 320 and are shaped and sized to at least partially receive the top or bottom ends of the racks 358, 368 (shown in FIG. 19). The circumferential slits 322 are circumferentially spaced from the slot 318 and the pin openings 320 so that the locking bar 360 and the sliders 370 can slide against the inner surface 382 of the inner sleeve 316 when being rotated. In examples, the first end 376 may include an annular recess 384 and/or an aperture 386.

Figure 21:
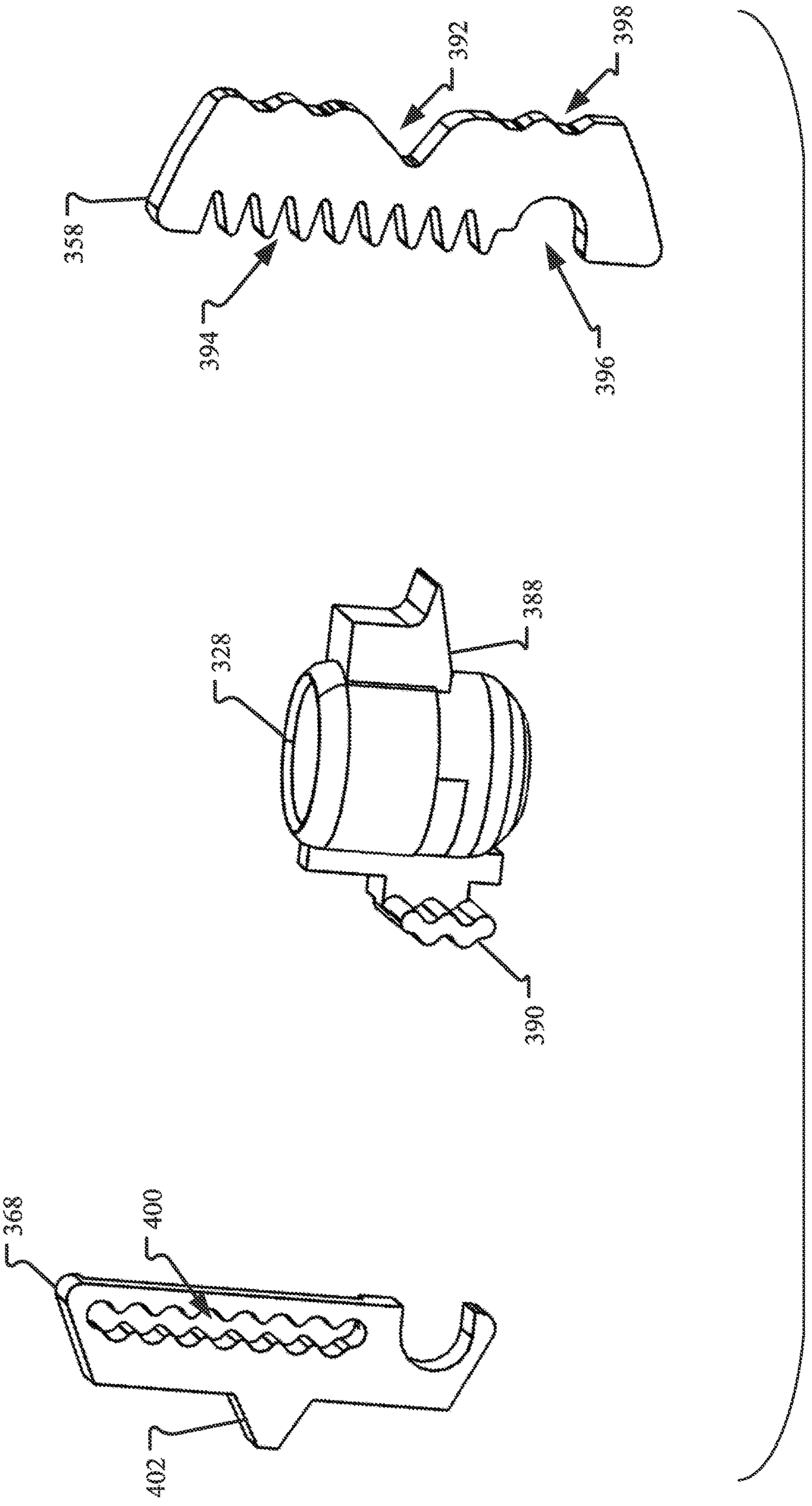
FIG. 21 is a perspective view of a key follower, a first rack, and a second rack of the rekeyable lock cylinder shown in FIGS. 18 and 19.

FIG. 21 is a perspective view of the key follower 328, the first rack 358, and the second rack 368. The key follower 328 includes a first rack engagement feature 388 configured to selectively engage with the first rack 358 and in a plurality of different positions. In the example, the first rack engagement feature 388 is a projecting tooth that extends in a transverse direction relative to the longitudinal axis 306 (shown in FIG. 18). The key follower 328 also includes a second rack engagement feature 390 configured to selectively engage with the second rack 368 and in a plurality of different positions. In the example, the second rack engagement feature 390 is a post that extends in a direction along the longitudinal axis 306 and similar to that described above. As such, the first rack engagement feature 388 is different than the second rack engagement feature 390.

The first rack 358 includes a locking bar engaging groove 392 is defined on one side and a first pin engagement feature 394 is defined on the other side. The first pin engagement feature 394 is configured to selectively engage with the key follower 328 and in a plurality of different positions. The first pin engagement feature 394 is configured to selectively engage with the first rack engagement feature 388 of the key follower 328. In the example, the first pin engagement feature 394 is a plurality of grooves on the side of the first rack 358. A groove 396 for rekeying and one or more anti-pick notches 398 may also be included. The second rack 368 has a second pin engagement feature 400 configured to selectively engage with the second rack engagement feature 390 of the key follower 328 and similar to the other example described above. A slider engagement feature 402 configured to engage with the slider 370 (shown in FIG. 19) and also similar to the other example described above. As shown in FIG. 21, the first rack 358 is different than the second rack 368, and the coupling connection with the key follower 328 is different between the first and second racks 358, 368. In other examples, the second rack 368 and the second pin engagement feature 400 may have a tooth/recess configuration as required or desired. In still other examples, the coupling connections may be the same between the first and second racks 358, 368 with the key follower 328.

EXAMPLES

Illustrative examples of the rekeyable lock cylinder disclosed herein are provided below. An embodiment of the rekeyable lock cylinder may include any one or more, and any combination of, the examples described below.

Example 1. A rekeyable lock cylinder comprising:
- a cylinder body defining a longitudinal axis;
- at least one pin slidably mounted on the cylinder body;
- an inner sleeve disposed within the cylinder body and being selectively rotatable around the longitudinal axis, the inner sleeve defining a slot extending along the longitudinal axis and at least one pin opening; and
- a plug assembly disposed at least partially within the inner sleeve and being selectively rotatable around the longitudinal axis, the plug assembly including:
  - a plug body having a first side and an opposite second side;
  - at least one key follower slidably mounted on the plug body;
  - a first carrier subassembly disposed on the first side of the plug body, the first carrier subassembly including:
    - a first carrier selectively slidable along the longitudinal axis for rekeying between different user keys;
    - a locking bar slidably mounted on the first carrier and selectively engageable with the slot of the inner sleeve to block rotation of the plug assembly relative to the inner sleeve; and
    - at least one first rack coupled between the at least one key follower and the locking bar to control movement of the locking bar;
  - a second carrier subassembly disposed on the second side of the plug body, the second carrier subassembly including:
    - a second carrier selectively slidable along the longitudinal axis for rekeying between different master keys;
    - at least one slider slidably mounted on the second carrier, wherein based on a position of the at least one slider within the second carrier, the at least one pin is selectively engageable with the at least one pin opening of the inner sleeve to block rotation of the inner sleeve relative to the cylinder body; and
    - at least one second rack coupled between the at least one key follower and the at least one slider to control movement of the at least one slider.

Example 2. The rekeyable lock cylinder of any one of Examples 1-16, further comprising at least one pin biasing member, wherein the at least one pin biasing member biases the at least one pin toward the at least one pin opening of the inner sleeve.

Example 3. The rekeyable lock cylinder of any one of Examples 1-16, wherein the at least one pin biasing member also biases the at least one slider inwards relative to the second carrier.

Example 4. The rekeyable lock cylinder of any one of Examples 1-16, wherein the at least one slider is not directly engaged with a biasing member disposed within the second carrier.

Example 5. The rekeyable lock cylinder of any one of Examples 1-16, wherein the cylinder body includes a chimney housing the at least one pin, the chimney radially projecting from an exterior surface of the cylinder body.

Example 6. The rekeyable lock cylinder of any one of Examples 1-16, wherein the cylinder body has an inner surface facing the inner sleeve, the inner surface does not have a longitudinally extending groove.

Example 7. The rekeyable lock cylinder of any one of Examples 1-16, wherein the inner sleeve defines a plurality of circumferential slits.

Example 8. The rekeyable lock cylinder of any one of Examples 1-16, wherein at least a portion of the at least one first rack extends at least partially within a slit of the plurality of circumferential slits when the at least one first rack is positioned by a master key.

Example 9. The rekeyable lock cylinder of any one of Examples 1-16, wherein at least a portion of the at least one second rack extends at least partially within a slit of the plurality of circumferential slits when the at least one second rack is positioned without a key within a keyway opening.

Example 10. The rekeyable lock cylinder of any one of Examples 1-16, wherein the at least one key follower includes a first rack engagement feature configured to engage the at least one first rack and a second rack engagement feature configured to engage the at least one second rack, wherein the first rack engagement feature is the same as the second rack engagement feature.

Example 11. The rekeyable lock cylinder of any one of Examples 1-16, wherein the at least one key follower includes a first rack engagement feature configured to engage the at least one first rack and a second rack engagement featured configure to engage the at least one second rack, wherein the first rack engagement feature is different than the second rack engagement feature.

Example 12. The rekeyable lock cylinder of any one of Examples 1-16, wherein the at least one first rack includes a first pin engagement feature configured to engage the at least one key follower and the at least one second rack includes a second pin engagement feature configured to engage the at least one key follower, wherein the first pin engagement feature is the same as the second pin engagement feature.

Example 13. The rekeyable lock cylinder of any one of Examples 1-16, wherein the at least one first rack includes a first pin engagement feature configured to engage the at least one key follower and the at least one second rack includes a second pin engagement feature configured to engage the at least one key follower, wherein the first pin engagement feature is different than the second pin engagement feature.

Example 14. The rekeyable lock cylinder of any one of Examples 1-16, wherein the at least one second rack includes a slider engagement feature configured to engage with the at least one slider.

Example 15. The rekeyable lock cylinder of any one of Examples 1-16, wherein the slider engagement feature is a single protruding lug.

Example 16. The rekeyable lock cylinder of any one of Examples 1-16, wherein the plug assembly includes a plug face extending from an end of the plug body, the plug face defining a first rekeying tool opening aligned with the first carrier and a second rekeying tool opening aligned with the second carrier, the first rekeying tool opening having a different size or shape than the second rekeying tool opening.

Example 17. A rekeyable lock cylinder comprising:

- a cylinder assembly including:
  - a cylinder body defining a longitudinal axis; and
  - at least one pin mounted on the cylinder body;
- an inner sleeve disposed within the cylinder body, the inner sleeve defining a slot extending along the longitudinal axis and at least one pin opening for receiving at least a portion of the at least one pin, wherein the at least one pin is inwardly biased toward the inner sleeve and selectively moveable between an engaged position, whereby the inner sleeve is blocked from rotating around the longitudinal axis relative to the cylinder body, and a disengaged position, whereby the inner sleeve is allowed to rotate around the longitudinal axis relative to the cylinder body; and
- a plug assembly disposed at least partially within the inner sleeve, the plug assembly including:
  - a plug body defining a keyway opening;
  - at least one key follower slidably mounted on the plug body;
  - a first carrier subassembly having a locking bar and at least one first rack, the at least one first rack coupled between the locking bar and the at least one first rack, wherein the locking bar is selectively movable between a locked position and an unlocked position upon receipt of a valid user key within the keyway opening, wherein in the locked position, the locking bar is disposed at least partially within the slot of the inner sleeve blocking rotation of the plug assembly around the longitudinal axis relative to the inner sleeve, wherein in the unlocked position, the locking bar is retracted from the slot of the inner sleeve allowing rotation of the plug assembly around the longitudinal axis relative to the inner sleeve, and wherein the at least one first rack is selectively disengagable from the at least one key follower to allow rekeying between different user keys; and
  - a second carrier subassembly having at least one slider and at least one second rack, the at least one second rack coupled between the at least one slider and the at least one second rack, wherein the at least one slider is selectively moveable between a blocked position and an unblocked position upon receipt of a valid master key within the keyway opening, wherein in the blocked position, the at least one slider extends into the at least one pin opening of the inner sleeve forcing the at least one pin towards the disengaged position, wherein in the unblocked position, the at least one slider is retracted from the at least one pin opening of the inner sleeve allowing the at least one pin to move towards the engaged position, and wherein the at least one second rack is selectively disengagable from the at least one key follower to allow rekeying between different master keys.

Example 18. The rekeyable lock cylinder of any one of Examples 17-28, wherein upon receipt of the valid user key, the at least one slider is in the unblocked position, thereby allowing the plug assembly to rotate around the longitudinal axis while the at least one pin is in the engaged position preventing the inner sleeve from rotating around the longitudinal axis.

Example 19. The rekeyable lock cylinder of any one of Examples 17-28, wherein upon receipt of the valid user key, both the at least one first rack and the at least one second rack move with the at least one key follower.

Example 20. The rekeyable lock cylinder of any one of Examples 17-28, wherein upon receipt of the valid master key, the at least one slider is in the blocked position, thereby allowing the inner sleeve and the plug assembly to rotate together around the longitudinal axis while the at least one pin is in the disengage position.

Example 21. The rekeyable lock cylinder of any one of Examples 17-28, wherein upon receipt of the valid master key, both the at least one first rack and the at least one second rack move with the at least one key follower.

Example 22. The rekeyable lock cylinder of any one of Examples 17-28, wherein the at least one first rack is moveable in a transverse direction relative to the longitudinal axis, and wherein the at least one first rack has a bitting position such that an end of the at least one first rack extends into the inner sleeve when the valid master key is in the keyway opening.

Example 23. The rekeyable lock cylinder of any one of Examples 17-28, wherein the at least one second rack is moveable in a transverse direction relative to the longitudinal axis, and wherein the at least one second rack has a bitting position such that an end of the at least one second rack extends into the inner sleeve when no key is received within the keyway opening.

Example 24. The rekeyable lock cylinder of any one of Examples 17-28, wherein the at least one pin is biased towards the engaged position.

Example 25. The rekeyable lock cylinder of any one of Examples 17-28, wherein the locking bar is biased towards the unlocked position.

Example 26. The rekeyable lock cylinder of any one of Examples 17-28, wherein the at least one slider is not directly biased.

Example 27. The rekeyable lock cylinder of any one of Examples 17-28, wherein the at least one first rack is different than the at least one second rack.

Example 28. The rekeyable lock cylinder of any one of Examples 17-28, wherein the at least one pin is biased towards the engaged position, and wherein the locking bar is biased towards the unlocked position, the biasing direction of the at least one pin and the locking bar being in opposing directions.

Example 29. A method of assembling a rekeyable lock cylinder comprising:

- providing a cylinder assembly having a cylinder body defining a longitudinal axis and a chimney housing at least one pin slidable therein;
- providing an inner sleeve defining a slot extending along the longitudinal axis and at least one pin opening;
- providing a plug assembly having a plug body with at least one key follower slidable therein;
- mounting a first carrier subassembly to a first side of the plug body of the plug assembly, the first carrier subassembly having a first carrier selectively slidable along the longitudinal axis for rekeying between different user keys, a locking bar slidably mounted on the first carrier and selectively engageable with the slot of the inner sleeve, and at least one first rack coupled between the at least one key follower and the locking bar to control movement of the locking bar;
- mounting a second carrier subassembly to a second side of the plug body of the plug assembly, the second carrier subassembly having a second carrier selectively slidable along the longitudinal axis for rekeying between different master keys, at least one slider slidably mounted on the second carrier, wherein based on a position of the at least one slider within the second carrier, the at least one pin is selectively engageable with the at least one pin opening of the inner sleeve, and at least one second rack coupled between the at least one key follower and the at least one slider to control movement of the at least one slider;
- inserting the plug assembly including the first and second carrier subassemblies at least partially within the inner sleeve, wherein the plug assembly is selectively rotatable within the inner sleeve based on position of the locking bar and the at least one slider; and
- inserting the inner sleeve with the plug assembly at least partially within the cylinder body, wherein the inner sleeve is selectively rotatable within the cylinder body based on position of the at least one pin.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A rekeyable lock cylinder comprising:
- a cylinder body defining a longitudinal axis;
- at least one pin slidably mounted on the cylinder body;
- an inner sleeve disposed within the cylinder body and being selectively rotatable around the longitudinal axis, the inner sleeve defining a slot extending along the longitudinal axis and at least one pin opening; and
- a plug assembly disposed at least partially within the inner sleeve and being selectively rotatable around the longitudinal axis, the plug assembly including:
  - a plug body having a first side and an opposite second side;
  - at least one key follower slidably mounted on the plug body;
  - a first carrier subassembly disposed on the first side of the plug body, the first carrier subassembly including:
    - a first carrier selectively slidable along the longitudinal axis for rekeying between different user keys;
    - a locking bar slidably mounted on the first carrier and selectively engageable with the slot of the inner sleeve to block rotation of the plug assembly relative to the inner sleeve; and
    - at least one first rack coupled between the at least one key follower and the locking bar to control movement of the locking bar;
  - a second carrier subassembly disposed on the second side of the plug body, the second carrier subassembly including:
    - a second carrier selectively slidable along the longitudinal axis for rekeying between different master keys;

at least one slider slidably mounted on the second carrier, wherein based on a position of the at least one slider within the second carrier, the at least one pin is selectively engageable with the at least one pin opening of the inner sleeve to block rotation of the inner sleeve relative to the cylinder body; and at least one second rack coupled between the at least one key follower and the at least one slider to control movement of the at least one slider.

2. The rekeyable lock cylinder of claim 1, further comprising at least one pin biasing member, wherein the at least one pin biasing member biases the at least one pin toward the at least one pin opening of the inner sleeve.

3. The rekeyable lock cylinder of claim 2, wherein the at least one pin biasing member also biases the at least one slider inwards relative to the second carrier.

4. The rekeyable lock cylinder of claim 1, wherein the cylinder body includes a chimney housing the at least one pin, the chimney radially projecting from an exterior surface of the cylinder body.

5. The rekeyable lock cylinder of claim 1, wherein the inner sleeve defines a plurality of circumferential slits.

6. The rekeyable lock cylinder of claim 1, wherein the at least one key follower includes a first rack engagement feature configured to engage the at least one first rack and a second rack engagement feature configured to engage the at least one second rack, wherein the first rack engagement feature is the same as the second rack engagement feature.

7. The rekeyable lock cylinder of claim 1, wherein the at least one key follower includes a first rack engagement feature configured to engage the at least one first rack and a second rack engagement feature configured to engage the at least one second rack, wherein the first rack engagement feature is different than the second rack engagement feature.

8. The rekeyable lock cylinder of claim 1, wherein the at least one first rack includes a first pin engagement feature configured to engage the at least one key follower and the at least one second rack includes a second pin engagement feature configured to engage the at least one key follower, wherein the first pin engagement feature is the same as the second pin engagement feature.

9. The rekeyable lock cylinder of claim 1, wherein the at least one first rack includes a first pin engagement feature configured to engage the at least one key follower and the at least one second rack includes a second pin engagement feature configured to engage the at least one key follower, wherein the first pin engagement feature is different than the second pin engagement feature.

10. The rekeyable lock cylinder of claim 1, wherein the at least one second rack includes a slider engagement feature configured to engage with the at least one slider.

11. The rekeyable lock cylinder of claim 1, wherein the plug assembly includes a plug face extending from an end of the plug body, the plug face defining a first rekeying tool opening aligned with the first carrier and a second rekeying tool opening aligned with the second carrier, the first rekeying tool opening having a different size or shape than the second rekeying tool opening.

12. A rekeyable lock cylinder comprising:

a cylinder assembly including:

a cylinder body defining a longitudinal axis; and at least one pin mounted on the cylinder body;

an inner sleeve disposed within the cylinder body, the inner sleeve defining a slot extending along the longitudinal axis and at least one pin opening for receiving at least a portion of the at least one pin, wherein the at least one pin is inwardly biased towards the inner sleeve and selectively moveable between an engaged position, whereby the inner sleeve is blocked from rotating around the longitudinal axis relative to the cylinder body, and a disengaged position, whereby the inner sleeve is allowed to rotate around the longitudinal axis relative to the cylinder body; and a plug assembly disposed at least partially within the inner sleeve, the plug assembly including:

a plug body defining a keyway opening;

at least one key follower slidably mounted on the plug body;

a first carrier subassembly having a locking bar and at least one first rack, the at least one first rack coupled between the locking bar and the at least one first rack, wherein the locking bar is selectively movable between a locked position and an unlocked position upon receipt of a valid user key within the keyway opening, wherein in the locked position, the locking bar is disposed at least partially within the slot of the inner sleeve blocking rotation of the plug assembly around the longitudinal axis relative to the inner sleeve, wherein in the unlocked position, the locking bar is retracted from the slot of the inner sleeve allowing rotation of the plug assembly around the longitudinal axis relative to the inner sleeve, and wherein the at least one first rack is selectively disengagable from the at least one key follower to allow rekeying between different user keys; and a second carrier subassembly having at least one slider and at least one second rack, the at least one second rack coupled between the at least one slider and the at least one second rack, wherein the at least one slider is selectively moveable between a blocked position and an unblocked position upon receipt of a valid master key within the keyway opening, wherein in the blocked position, the at least one slider extends into the at least one pin opening of the inner sleeve forcing the at least one pin towards the disengaged position, wherein in the unblocked position, the at least one slider is retracted from the at least one pin opening of the inner sleeve allowing the at least one pin to move towards the engaged position, and wherein the at least one second rack is selectively disengagable from the at least one key follower to allow rekeying between different master keys.

13. The rekeyable lock cylinder of claim 12, wherein upon receipt of the valid user key, the at least one slider is in the unblocked position, thereby allowing the plug assembly to rotate around the longitudinal axis while the at least one pin is in the engaged position preventing the inner sleeve from rotating around the longitudinal axis.

14. The rekeyable lock cylinder of claim 12, wherein upon receipt of the valid user key, both the at least one first rack and the at least one second rack move with the at least one key follower.

15. The rekeyable lock cylinder of claim 12, wherein upon receipt of the valid master key, the at least one slider is in the blocked position, thereby allowing the inner sleeve and the plug assembly to rotate together around the longitudinal axis while the at least one pin is in the disengaged position.

16. The rekeyable lock cylinder of claim 12, wherein upon receipt of the valid master key, both the at least one first rack and the at least one second rack move with the at least one key follower.

17. The rekeyable lock cylinder of claim 12, wherein the locking bar is biased towards the unlocked position.

18. The rekeyable lock cylinder of claim 12, wherein the at least one first rack is different than the at least one second rack.

19. The rekeyable lock cylinder of claim 12, wherein the at least one pin is biased towards the engaged position, and wherein the locking bar is biased towards the unlocked position, the biasing direction of the at least one pin and the locking bar being in opposing directions.

20. A method of assembling a rekeyable lock cylinder comprising:

providing a cylinder assembly having a cylinder body defining a longitudinal axis and a chimney housing at least one pin slidable therein;

providing an inner sleeve defining a slot extending along the longitudinal axis and at least one pin opening;

providing a plug assembly having a plug body with at least one key follower slidable therein;

mounting a first carrier subassembly to a first side of the plug body of the plug assembly, the first carrier subassembly having a first carrier selectively slidable along the longitudinal axis for rekeying between different user keys, a locking bar slidably mounted on the first carrier and selectively engageable with the slot of the inner sleeve, and at least one first rack coupled between the at least one key follower and the locking bar to control movement of the locking bar;

mounting a second carrier subassembly to a second side of the plug body of the plug assembly, the second carrier subassembly having a second carrier selectively slidable along the longitudinal axis for rekeying between different master keys, at least one slider slidably mounted on the second carrier, wherein based on a position of the at least one slider within the second carrier, the at least one pin is selectively engageable with the at least one pin opening of the inner sleeve, and at least one second rack coupled between the at least one key follower and the at least one slider to control movement of the at least one slider;

inserting the plug assembly including the first and second carrier subassemblies at least partially within the inner sleeve, wherein the plug assembly is selectively rotatable within the inner sleeve based on position of the locking bar and the at least one slider; and inserting the inner sleeve with the plug assembly at least partially within the cylinder body, wherein the inner sleeve is selectively rotatable within the cylinder body based on position of the at least one pin.

* * * * *